(12) United States Patent
Vivanco et al.

(10) Patent No.: US 12,177,688 B2
(45) Date of Patent: Dec. 24, 2024

(54) FIFTH GENERATION GEOFENCING FOR USER EQUIPMENT

(71) Applicants: AT&T Intellectual Property I, L.P., Atlanta, GA (US); AT&T Technical Services Company, Inc., Vienna, VA (US)

(72) Inventors: Daniel Vivanco, Ashburn, VA (US); David Ross Beppler, Duluth, GA (US); Slawomir Stawiarski, Carpentersville, IL (US)

(73) Assignees: AT&T Intellectual Property I, L.P., Atlanta, GA (US); AT&T Technical Services Company, Inc., Vienna, VA (US)

( * ) Notice: Subject to any disclaimer, the term of this patent is extended or adjusted under 35 U.S.C. 154(b) by 336 days.

(21) Appl. No.: 17/653,909

(22) Filed: Mar. 8, 2022

(65) Prior Publication Data

US 2023/0292143 A1    Sep. 14, 2023

(51) Int. Cl.
*H04W 16/28*   (2009.01)
*H04W 4/021*   (2018.01)
*H04W 4/029*   (2018.01)
*H04W 36/32*   (2009.01)
*H04W 56/00*   (2009.01)
*H04W 84/06*   (2009.01)

(52) U.S. Cl.
CPC .......... *H04W 16/28* (2013.01); *H04W 4/022* (2013.01); *H04W 4/029* (2018.02); *H04W 36/32* (2013.01); *H04W 56/001* (2013.01); *H04W 84/06* (2013.01)

(58) Field of Classification Search
CPC ..... H04W 16/28; H04W 4/022; H04W 4/029; H04W 36/32; H04W 56/001; H04W 84/06; H04W 36/085; H04W 52/146; H04W 52/283; H04W 52/42; H04W 88/02; H04B 7/0695
See application file for complete search history.

(56) References Cited

U.S. PATENT DOCUMENTS

| | | | |
|---|---|---|---|
| 11,206,078 B1* | 12/2021 | Masoomzadeh | H04B 7/2041 |
| 2020/0288407 A1* | 9/2020 | Kalhan | H04W 52/243 |
| 2021/0208602 A1* | 7/2021 | Yi | G05D 1/0011 |
| 2021/0263538 A1* | 8/2021 | Kwak | H04L 69/40 |
| 2022/0386208 A1* | 12/2022 | Phuyal | G08G 5/0013 |

OTHER PUBLICATIONS

"Study on enhanced LTE support for aerial vehicles," RP-170779, NTT DOCOMO, Ericsson, Mar. 2017, http://www.3gpp.org/ftp/tsg_ran/tsg_ran/TSGR_75/Docs/RP170779.zip, Accessed on Mar. 8, 2022, 4 pages.

* cited by examiner

*Primary Examiner* — Jung H Park

(57) ABSTRACT

An architecture to dynamically create fifth generation technology based geofences around defined areas to ensure the safe operation of user equipment (UE). A method can comprise determining that first serving cell equipment is servicing an aerial user equipment determining that the first serving cell equipment has enabled beamforming, determining that a first beam of a group of beams is being used to service the aerial user equipment, determining a second beam of the group of beams that the first serving cell equipment will use to service to the aerial user equipment, determining that a handover event from the first serving cell equipment to a second serving cell equipment will occur, and causing the first serving cell equipment to adjust an emitted power level associated with the second beam.

16 Claims, 12 Drawing Sheets

FIFTH GENERATION GEOFENCING FOR USER EQUIPMENT

TECHNICAL FIELD

The disclosed subject matter relates to detection of aerial user equipment (UE) approaching defined restricted areas and creating technology based advanced network geofencing areas around these defined restricted areas using synchronization signal block (SSB) beam muting.

BACKGROUND

Wireless operators can use terrestrial cellular network equipment, such as long-term evolution (LTE) and/or fifth-generation (5G) core mobile network operator (MNO) equipment to provide services to aerial UE. Aerial user equipment UE can have multiple use cases (e.g., delivery, monitoring, . . . ). Wireless operators can have aerial coverage maps, which can indicate areas with and without cellular coverage. In addition, unmanned aerial vehicles (UAVs), such as aerial UE, can scan neighbor equipment signal pilots (e.g., reference signal received power (RSRP) measurement values) to determine whether they can fly in a given direction.

DETAILED DESCRIPTION

Figure 1:
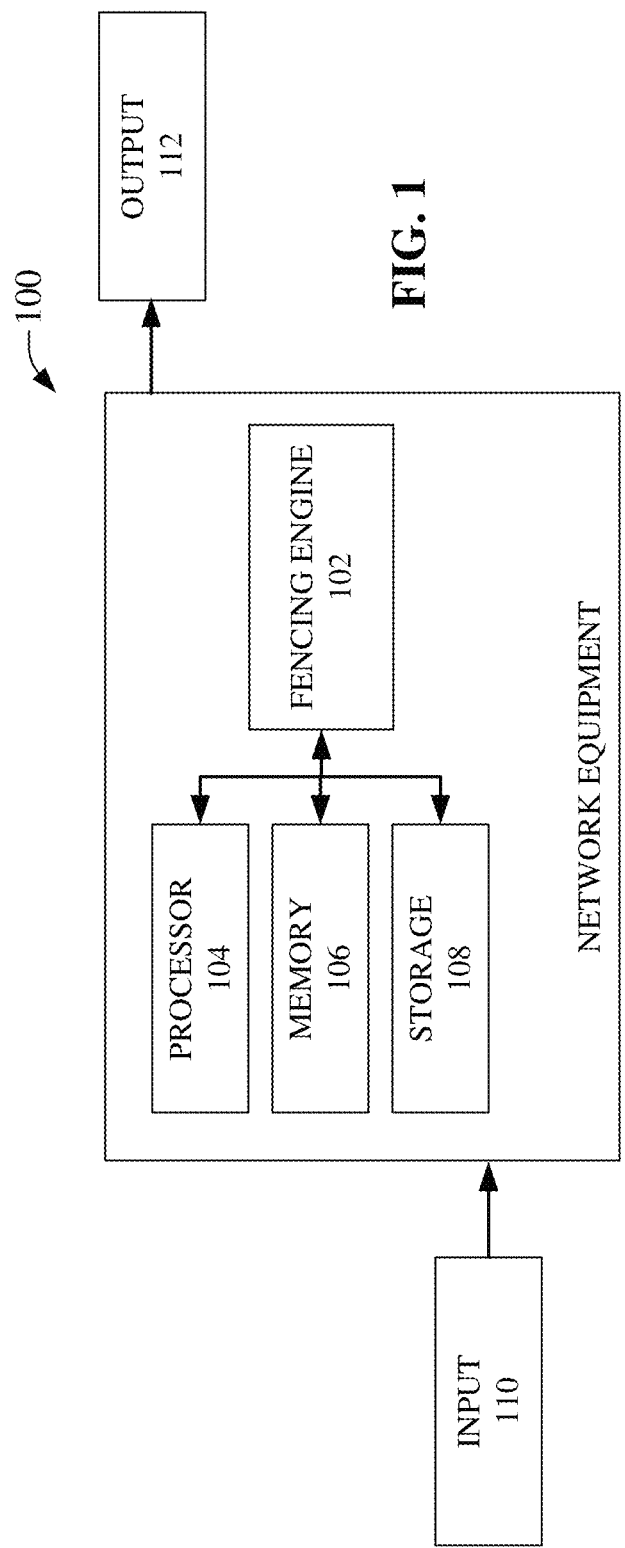
FIG. 1 is an illustration of a system that dynamically create technology based fifth generation geofences around defined or definable areas for UE, in particular aerial UE, while ensuring the safe operation of UE, in accordance with aspects of the subject disclosure.

The subject disclosure is now described with reference to the drawings, wherein like reference numerals are used to refer to like elements throughout. In the following description, for purposes of explanation, numerous specific details are set forth in order to provide a thorough understanding of the subject disclosure. It may be evident, however, that the subject disclosure may be practiced without these specific details. In other instances, well-known structures and devices are shown in block diagram form in order to facilitate describing the subject disclosure.

The disclosed subject matter, in accordance with various embodiments, provides a system, apparatus, equipment, or device comprising: a processor, and a memory that stores executable instructions that, when executed by the processor, facilitate performance of operations. The operations can comprise tracking an aerial user equipment based on subscription data and location data, determining that first serving cell equipment is servicing the aerial user equipment and that the first serving cell equipment has enabled a beamforming functionality, determining that a first beam of a group of beams being emitted from the first serving cell equipment is being used to service the aerial user equipment, determining a second beam of the group of beams that the first serving cell equipment will use to provide the service to the aerial user equipment, determining, based at least on the location data and a directionality associated with the second beam, that a handover event from the first serving cell equipment to a second serving cell equipment will occur, wherein the second serving cell equipment is proximate to a defined geographical area, and in response to determining that the second serving cell equipment is proximate to the defined geographical area, causing the first serving cell equipment to adjust an emitted power level associated with the second beam.

The group of beams can comprise system synchronization beam data representative of synchronization data, signal power data, physical cell identification data, and beam identification data associated with servicing the aerial user equipment, wherein further operations can comprise in response to the aerial user equipment being unable to receive the synchronization beam data, the aerial user equipment alters a flight trajectory to attach to a third beam of the group of beams. The emitted power level can be at a first emitted power level, wherein the third beam is associated with a second emitted power level that is greater than the first emitted power level. Additionally, the emitted power level can be a first emitted power level, and wherein the third beam can be associated with a second emitted power level that exceeds a threshold power level associated with the group of beams.

In regard to the foregoing, the subscription data can represent an international mobile subscriber identifier value representative of the aerial user equipment, the location data represents geolocation and time information received via global navigation satellite system equipment; and the directionality can be a second directionality, wherein a first directionality can be associated with the first beam, and the first directionality can differ from the second directionality.

In accordance with further embodiments, the subject disclosure describes methods and/or processes, comprising a series of acts that, for example, can include: tracking, by a device comprising a processor, an aerial user equipment based on subscription data and location data, in response to receiving a command, via core network equipment, initiating, by the device, a beamforming functionality, determining, by the device, that a first beam of a group of beams is being used to service the aerial user equipment, determining, by the device, a second beam of the group of beams that will be used to provide the service to the aerial user equipment, based at least on the location data and a direction associated with the second beam, determining, by the device, that a handover event from the device to a first serving cell equipment will occur, wherein the first serving cell equipment is proximate to a defined geographical area, and in response to determining that the first serving cell equipment is proximate to the defined geographical area, reducing, by the device, an emitted power level associated with the second beam.

In regard to the foregoing the group of beams can comprise system synchronization beam data that can represent synchronization data, signal power data, physical cell identification data, and beam identification data associated with servicing the aerial user equipment. Additional acts can include in response to the aerial user equipment being unable to receive the synchronization beam data, causing, by the device, the aerial user equipment to change a flight trajectory to seek a third beam of the group of beams.

Further, in relation to the foregoing the emitted power level can be a first emitted power level, and the third beam can be associated with a second emitted power level that is greater than the first emitted power level, the emitted power level can be a first emitted power level and the third beam can be associated with a second emitted power level that exceeds a threshold power level associated with the group of beams, the direction can be a first direction, and a second direction can be associated with the second beam, such that the first direction can be different from the second direction.

In accordance with still further embodiments, the subject disclosure describes machine readable media, a computer readable storage devices, or non-transitory machine readable media comprising instructions that, in response to execution, cause a computing system (e.g., equipment, devices, groupings of devices, etc.) comprising at least one processor to perform operations. The operations can include: determining that first serving cell equipment is servicing an aerial user equipment and that the first serving cell equipment has enabled a beamforming functionality, determining that a first beam of a group of beams being emitted by the first serving cell equipment is being used to service the aerial user equipment, determining a second beam of the group of beams that the first serving cell equipment will use to provide the service to the aerial user equipment, determining, based on location data associated with the aerial user equipment and a direction associated with the second beam, that a handover event from the first serving cell equipment to a second serving cell equipment will occur, wherein the second serving cell equipment is proximate to a defined geographical area, and in response to determining that the second serving cell equipment is proximate to the defined geographical area, causing the first serving cell equipment to adjust an emitted power level associated with the second beam.

Further operations can comprise tracking, by the first cell equipment, the aerial user equipment based on the location and subscription data associated with the aerial user equipment.

Additionally, in relation to the foregoing, the group of beams can comprise system synchronization beam data that can be representative of synchronization data, signal power data, physical cell identification data, and beam identification data associated with servicing the aerial user equipment, such that when the aerial user equipment is unable to receive the synchronization beam data, the aerial user equipment can alter or adapt its flight trajectory to adhere to a third beam of the group of beams, wherein the emitted power level is a first emitted power level and wherein the third beam is associated with a second emitted power level that is greater than the first emitted power level, and/or wherein the third beam is associated with a second emitted power level that exceeds a threshold power level associated with the group of beams.

The subject disclosure, in example embodiments, describes identification and/or detection of user equipment, such as aerial or airborne user equipment (UE) approaching restricted areas, such as airports, military bases, identifiable governmental buildings, and the like, and based at least in part on the detection of the approaching aerial UE in the proximity of the restricted areas, creating or establishing fifth generation (5G) technology based geofencing around the restricted area. In some embodiments, a determination can be made as to whether or not serving cell equipment proximate to the approaching aerial UE is capable of performing beamforming or spatial filtering. Generally, serving cell equipment capable of facilitating or effectuating beamforming can implement signal processing techniques that can be used in sensor arrays (e.g., groups of sensors, such as radio antenna arrays, usually arranged in geometric patterns, used for collecting and processing electromagnetic or acoustic signals). Beamforming generally can be achieved by combining elements in antenna arrays in such a way that signals at particular angles experience constructive interference while others experience destructive interference. Beamforming can typically be used in both the transmitting and receiving ends in order to achieve spatial selectivity. Should it be determined that the proximate serving cell equipment is capable of performing beamforming, but the beamforming facility is disabled, core network equipment can direct the proximate serving cell equipment to enable beamforming functionalities.

Once beamforming has been enabled at the proximate serving cell equipment, proximate serving cell equipment can identify a beam of a group of beams that is currently being used to service aerial UE, and can also estimate which of the beams comprising the group of beams that aerial UE may or will use in the near term in instances where aerial UE approaches or enters a defined restricted area. Additionally, a prediction can be made as to which of the beams of the group of beams that the aerial UE may or will use should there be a need to hand over (HO) service from a first serving cell equipment to a second serving cell equipment, and should it be determined that the aerial UE may or will encroach into the defined restricted area.

Based on the prediction that the aerial UE will encroach into the defined restricted area in the near future, core network equipment can direct serving cell equipment proximate to the aerial UE to exclude identified or identifiable beams of the group of beams from emission. Excluding identified or determined beams of the group of beams from emission can in some embodiments reduce partially or completely the emission power of the identified or determined beams; the partial reduction or complete reduction of the emission power to the selected beams can be a form of muting.

Synchronization signal block (SSB) muting can prevent transmission of download (DL) signals from networking equipment (e.g., serving cell equipment) to UE (both terrestrial based UE and/or aerial UE) within the broadcast coverage umbrae/penumbrae in a defined direction relative to and/or around the networking equipment. SSB muting can cause UE within the broadcast coverage area of networking equipment to not receive DL transmission data (e.g., synchronization data, signal power data, physical cell identification data, beam identification data, and the like) from serving cell equipment. Typically, SSB beams are used to provide synchronization data, signal power data, physical cell identification data, beam identification data, and similar data to UE.

In instances where the UE are aerial UE, when aerial UE detect that no beam synchronization signal data in a given location and/or direction is available and/or has not been received, the aerial UE can adjust its trajectory to avoid what the aerial UE perceives as a coverage hole. In this manner aerial UE can be forced away from defined restricted areas.

Wireless mobile network operator entities (MNOs) can use terrestrial cellular network equipment, such as long-term evolution (LTE) and/or fifth-generation (5G) core mobile network operator (MNO) equipment (e.g., serving cell equipment, base station equipment, access point equipment, internet of things (IoT) equipment, picocell equipment, femtocell equipment, and/or other similar and pertinent equipment) to provide services to aerial UE. Aerial UE can have multiple use cases (e.g., delivery, monitoring, . . . ). Wireless MNOs can have aerial coverage maps, which can indicate areas with and/or without cellular coverage. In addition, unmanned aerial vehicles (UAVs), such as aerial UE, can scan neighbor equipment signal pilots (e.g., reference signal received power (RSRP) measurement values) to determine whether it can fly in a given direction. In instances where signal pilots are not detectable in a direction in which a UAV is traversing, the UAV can change or adjust its trajectory to better align with cellular coverage where appropriate signal pilots are more evident.

There can be areas within the country that can be considered off-limits, such as militarily sensitive areas, governmentally designated sensitive areas (e.g., the White House, Capitol buildings, . . . ), ad hoc areas that can be designated as sensitive areas for defined periods of time (e.g., during special events, . . . ), airports, and contemporaneously established finite duration areas set up for the purposes of emergencies, special events, and the like. MNOs need to create technology constraints to restrict these areas, while at the same time ensuring the safe operation of UAVs within their spheres of influence (e.g., within areas monitored and/or controlled by equipment associated with the MNO). The standards organizations that develop protocols, standards, and/or recommendations for mobile telecommunications, such as the 3rd generation partnership project (3GPP), have yet to address this issue.

The subject disclosure provides for detecting UE (e.g., terrestrial based UE and/or airborne aerial UE) approaching restricted areas, and in response to detecting UE approaching restricted areas, a 5G technology based geofence can be established around the restricted areas or specific sectors or sub-areas of the restricted areas, while at the same time ensuring the safe operation of UE.

In some embodiments, the UE is identified based, for example, on international mobile subscriber identifier (IMSI) values, or subscriber identity module or subscriber identification module (SIM) values (e.g., one or more integrated circuits that can securely store subscriber identification values and related key values and that can be used to identify and authenticate subscriber UE).

In various other embodiments, the approaching UE are identified based on other subscriber or subscription data, such as unique UE serial number values, governmentally issued unique identification values (e.g., federal aviation administration tag values), UE manufacturer serial number values, unique visual identification values affixed to UE, unique identification values rendered perceivable using, for example, irradiated ultra-violet light, and/or unique identification values rendered observable, for instance, through illumination using infra-red light.

In other embodiments, identification of approaching UE can be facilitated using one-dimensional and/or multi-dimensional scanning technologies and barcode symbology, such as universal product codes (UPCs), matrix bar codes (e.g., quick response (QR) codes) comprising machine-readable optical labels, and the like that can include information about the equipment to which it is attached.

In one or more embodiments, having identified and/or detected an approaching UE, the detected UE can be monitored and tracked to determine whether or not the approaching UE is on a trajectory that may encroach into the vicinity of identified or identifiable restricted areas. In order to determine whether or not the approaching UE may be on a trajectory that may encroach into identified and/or identifiable restricted areas, artificial intelligence technologies, neural networking architectures, collaborative filtering processes, machine learning techniques, and/or big data mining functionalities can be utilized, wherein, for example, probabilistic determinations based at least in part on cost benefit analyses (e.g., the cost of taking a particular action is weighed against the benefit of taking the particular action, wherein in response to determining that the benefit associated with the action outweighs the cost associated with the action, the action is identified as an action worthy of consideration and implementation) can be undertaken. In additional and/or alternative other embodiments, artificial intelligence technologies, neural networking architectures, collaborative filtering processes, machine learning techniques, Bayesian belief systems, big data mining and data analytic functionalities, and the like, can be employed, wherein, for example, multi-objective optimization (e.g., Pareto optimization) can be used to determine whether or not an action should be initiated and implemented. Multi-objective optimization can ensure that first actions or groups of first actions can only be implemented provided that other second actions or groups of other second actions are not detrimentally affected.

In example embodiments, in order to track UE entering and/or exiting the control and/or the monitoring ambit (e.g., processes in execution), one or more global navigation satellite system (GNSS) equipment can be used that can provide geolocation and/or time information to global positioning satellite (GPS) equipment (e.g., transmitter and/or receiver equipment) anywhere on or near the earth where there is an unobstructed line of sight to the one or more GNSS equipment, such as one or more GPS satellites in various earth orbits. Additionally and/or alternatively, other triangulation processes can be used to keep track of UE. For instance, in various embodiments, ranges (e.g., variable distances) can be determined by targeting UE with light amplification by stimulated emission of radiation (e.g., laser) and measuring the time for the reflected light to return to one or more receiver (e.g., lidar) can be used to track UE approaching and/or entering into a determined vicinity of a restricted area. In a similar manner, a detection system that uses radio waves to determine the range, angle, or velocity of objects (e.g., radar) can be used to determine whether or not UE are approaching and/or entering into the determined vicinity of the restricted area. Other mechanisms to track UE can also include using multilateration (e.g., determining UE position based on the measurement of the times of arrival (TOA) of one or more energy wave (e.g., radio, acoustic, seismic, etc.) having known waveforms and/or speed when propagating either from and/or to multiple emitters and/or receivers of the waves) between one or more network equipment (e.g., serving cell equipment, base station equipment, internet of things (IoT) equipment, picocell equipment, femtocell equipment, and similarly functional equipment). In some instances, a UE's returned signal strength values to various antennae associated with the one or mode network equipment can be used to triangulate and provide a positional references as to the trajectory of an individual UE. In additional and/or alternative instances, timing advance (TA) processes can be used as a measure of TOA. Typically, TA is a determined distance from serving cell equipment based at least in part on delay measurements associated with TOA values. TA values can be reported while aerial UE are in communication with serving cell equipment.

The described embodiments, based on determining that UE are approaching defined or determinable restricted areas, can initiate processes to facilitate and/or effectuate the following tasks: (1) determine whether or not serving cell equipment tracking or monitoring the trajectory of aerial UE have beamforming capabilities, and in response to determining that the serving cell equipment have beamforming capabilities, causing the serving cell equipment to enable beamforming functionalities; (2) detect the beam of a group of beams being emitted by the monitoring or tracking serving cell equipment to which the aerial UE is currently attached (e.g., the beam from which the aerial UE is receiving synchronization data, signal power data, physical identification data, beam identification data, and similar relevant control data); (3) based on having identified the beam of the group of beams to which the aerial UE is currently attached, a determination can be facilitated to estimate one or more alternate beams of the group of beams that the aerial UE may need to use in the near future; (4) in response to estimating the one or more alternate beams that the aerial UE may use in the future, a further determination can be made as to which of the one or more alternate beams may cause the aerial UE to encroach into a defined restricted area should a handover of the aerial UE be effectuated to other serving cell equipment that can be located near the defined restricted area; (5) based on identifying the one or more alternate beams that may cause the aerial UE to encroach into the define restricted area and/or identifying other serving cell equipment, handover to which, can cause the aerial UE to enter or encroach into the defined restricted area, instructions can be transmitted by core network equipment, and received by serving cell equipment of a collection of serving cell equipment that any beams that may induce the aerial UE to approach or enter the defined restricted area to be powered down (e.g., the emission power associated with any beams of the one or more alternate beams that may cause the aerial UE to approach or enter into the defined restricted area can be partially and/or completely reduced); and (6) in response the emission power associated with any beams of the one or more alternate beams being partially and/or completely reduced, the aerial UE can identify and select beams that will lead it to avoid the defined restricted area.

In the foregoing manner, one or more of the disclosed embodiments can create a 5G technology based geofence around restricted areas for UE (e.g., aerial UE) served by terrestrial based LTE and/or 5G network equipment associated with MNOs. It will be noted that restricted areas, in some embodiments, can be permanently restricted areas, such around airports, military bases, and identified governmental structures (e.g., parliamentary buildings, important governmental offices, and similar such structures). In other embodiments, the restricted areas can be contemporaneously and temporarily established, such as when special events are planned or are on-going during determined times, during times of national emergencies (e.g., localized disaster relief efforts, . . . ), and the like.

In the context of the subject disclosure, network equipment and/or serving cell equipment can typically be base station equipment, eNodeB equipment, eNB equipment, gNodeB equipment, picocell equipment, macrocell equipment, microcell equipment, femtocell equipment, IoT equipment operating as mobile network operation (MNO) network equipment, access point equipment, or other such equipment. Further, the disclosed systems and/or methods can be operational at central node global control equipment (e.g., network equipment) located in the core network. Examples of central node global control equipment can be mobile edge computing (MEC) equipment, self organized network (SON) equipment, and/or radio access network intelligent controller (RIC) equipment.

In some embodiments, UE information data and/or UE device type data is collected. It can be detected when, where, and whether an aerial UE is attached to, and/or is in operative communication with, the core network (or identifiable segments of the core network). Additionally, in accordance with further example embodiments, data can be collected that is representative of serving cell equipment capabilities, as well as network topologies of serving cell equipment (e.g., the network topologies of serving cell equipment currently providing service to aerial UE and/or terrestrial based UE situated within the broadcast range of current cell equipment and neighboring serving cell equipment that can be immediately proximate to, or positioned at distance from, current serving cell equipment). In accordance with various other example embodiments, data can also be collected that is representative of the geographical topographies and/or locations within which current serving cell equipment and its neighboring serving cell equipment are situated.

In accordance with some embodiments, based at least in part on data representative of UE information and UE device type, it can be determined whether or not a UE is an aerial UE. Information in regard to whether or not UE is an aerial type UE or terrestrial based UE can be conveyed and communicated to central node global control equipment as a flag comprising one or more bits. The central node global control equipment can then utilize and/or consult, for example, one or more database equipment comprising groups of relevant database tuples to correlate the received bits with an UE type (e.g., aerial UE or terrestrial based UE).

Additionally, central node global control equipment, based at least in part on data representative of serving cell equipment capabilities, network topologies of serving cell equipment, and the geographical topographies and/or locations within which serving cell equipment are situated, can detect the approach of UE, such as airborne or aerial UE, into the proximity of restricted areas. For instance, with reference to FIG. 2, central node global control equipment can detect the approach and/or entry of airborne or aerial UE 202 into the proximity of area 200 being monitored and/or controlled by central node global control equipment, and in particular into the general vicinity of restricted area 206.

Figure 2:
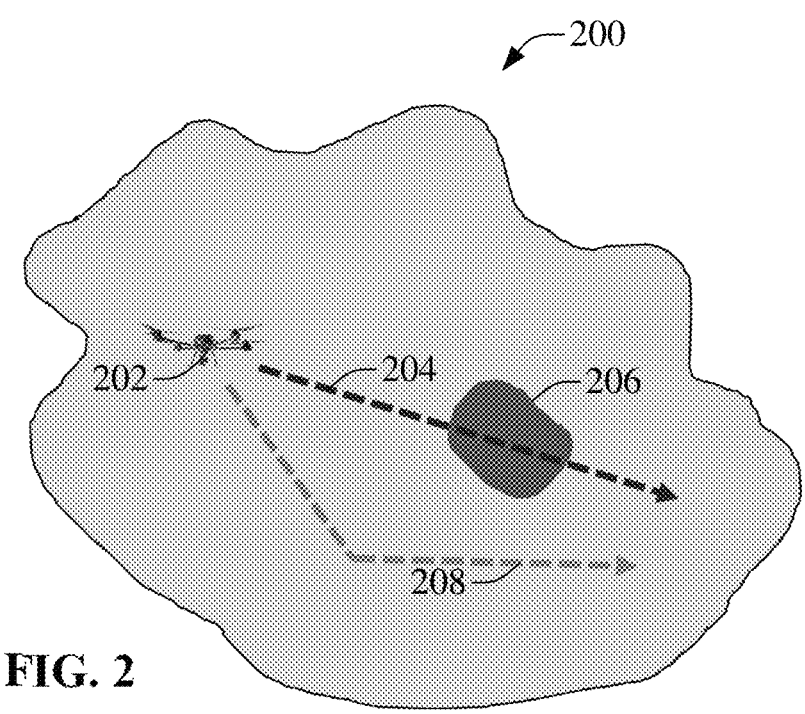
FIG. 2 provides illustration of possible trajectories associated with an aerial UE entering a controlled and monitored airspace and encroaching and/or avoiding a restricted airspace in the controlled and monitored airspace, in accordance with aspects of the subject disclosure.

As illustrated in FIG. 2, two trajectories are depicted a first putative or presumed trajectory 204 and a second putative or presumed trajectory 208. The first putative trajectory 204 can be a trajectory that central node global control equipment can determine as being a trajectory that can cause aerial UE 202 to encroach into airspace 206 that is restricted and/or "off-limits," whereas the second putative trajectory 208 can be a trajectory that the central node global control equipment can determine as being a trajectory that can cause aerial UE 202 to avoid and/or circumvent restricted airspace 206 and thereby not encroach into the restricted area 206.

In order to cause aerial UE 202 to utilize the second putative trajectory 206 in preference to the first putative trajectory 208, central node global control equipment on determining that aerial UE 202 appears to be on a trajectory (e.g., first putative trajectory 204) that would take it into the restricted area 206 can determine whether or not serving cell equipment tracking or monitoring the trajectory of aerial UE 202 have beamforming capabilities. The central node global control equipment, in response to determining that the serving cell equipment have beamforming capabilities, can cause the serving cell equipment to enable beamforming functionalities. Thereafter, central node global control equipment can facilitate the serving cell equipment to detect the beam of a grouping of beams being emitted by the serving cell equipment that is controlling, monitoring, and/or tracking the aerial UE 202. The central node global control equipment, based at least in part on having identified the beam of the grouping of beams to which the aerial UE 202 is currently attached, determine one or more alternate beams of the grouping of beams that the aerial UE 202 may need to use in the near future. The central node global control equipment based on having determined one or more alternate beams that the aerial UE 202 may use in the future, can further determine which of the one or more alternate beams may cause the aerial UE 202 to encroach into a defined restricted area 206 should a handover of the aerial UE 202 be effectuated to other serving cell equipment that can be located proximate to the defined restricted area 206. The central node global control equipment, based at least in part on having identified one or more alternate beams that may cause the aerial UE 202 to encroach into the defined restricted area 206 and/or having identified other serving cell equipment, handover to which, can cause the aerial UE 202 to enter or encroach into the defined restricted area 206, can instruct serving cell equipment of a collection of serving cell equipment that any beams that might cause the aerial UE 202 to approach or enter the defined restricted area to be powered down. The aerial UE 202 in response the emission power associated with any beams of the one or more alternate beams being partially and/or completely reduced, can identify and select beams that will lead it to avoid the defined restricted area 206.

Now with reference to FIG. 1 that illustrates a system 100 (e.g., network equipment—central node global control equipment) that dynamically creates technology based fifth generation (5G) geofences around defined or definable areas for UE, in particular aerial UE, while ensuring the safe operation of UE. Examples of central node global control equipment can include mobile edge compute (MEC) equipment, self organized network (SON) equipment, and/or radio access network (RAN) intelligent controller (RIC) equipment.

As illustrated system 100 can comprise muting engine 102 that can be communicatively coupled to processor 104, memory 106, and storage 108. Muting engine 102 can be in communication with processor 104 for facilitating operation of computer and/or machine executable instructions and/or components by muting engine 102, memory 106 for storing data and/or the computer or machine executable instructions and/or components, and storage 108 for providing longer term storage for data and/or machine and/or computer machining instructions. Additionally, system 100 can receive input 110 for use, manipulation, and/or transformation by muting engine 102 to produce one or more useful, concrete, and tangible result, and/or transform one or more articles to different states or things. Further, system 100 can also generate and output the useful, concrete, and tangible results, and/or the transformed one or more articles produced by muting engine 102, as output 112.

In some embodiments, system 100 can be Internet of Things (IoT) small form factor equipment capable of effective and/or operative communication with a network topology. Additionally in alternative embodiments, system 100 can be any type of mechanism, machine, device, apparatus, equipment, and/or instrument that can be utilized to dynamically configure inter-cell interference coordination between terrestrial based serving cell equipment that are serving aerial UE. Examples of types of mechanisms, equipment, machines, devices, apparatuses, and/instruments can include virtual reality (VR) devices, wearable devices, heads up display (HUD) devices, machine type communication devices, and/or wireless devices that communicate with radio network nodes in a cellular or mobile communication system. In various other embodiments, system 100 can comprise tablet computing devices, handheld devices, server class computing machines and/or databases, laptop computers, notebook computers, desktop computers, cell phones, smart phones, commercial and/or consumer appliances and/or instrumentation, industrial devices and/or components, personal digital assistants, multimedia Internet enabled phones, Internet enabled devices, multimedia players, aeronautical/avionic devices associated with, for example, orbiting satellites and/or associated aeronautical vehicles, and the like.

Muting engine 102 can identify UE, e.g., aerial UE, based at least in part, for example, on IMSI values, or SIM values. Additionally and/or alternatively, muting engine 102 can identify approaching UE based on other subscriber or subscription data, such as unique UE serial number values, governmentally issued unique identification values, such as federal aviation administration tag values, UE manufacturer serial number values, UE model number values, unique visual identification values affixed to UE, unique identification values rendered perceivable using, for example, irradiated ultra-violet light, and/or unique identification values rendered observable, for instance, through illumination using infra-red light.

In other embodiments, identification of approaching UE can be facilitated by muting engine 102 through use of one-dimensional and/or multi-dimensional scanning technologies and barcode symbology, such as UPCs, matrix bar codes comprising machine-readable optical labels, and the like that can include information about the equipment to which it is attached.

In yet additional embodiments, identification of approaching UE can be effectuated muting engine 102 by using computer-vision based recognition technologies, wherein one or more unique surface contours (or identifiable surface point patterns) of the approaching UE can be compared with repositories and databases of manufacturer defined contours or determinable surface point patterns associated with UE.

Muting engine 102, having identified and/or detected approaching UE can monitor and track the detected UE to determine whether or not the approaching UE is on a trajectory that may encroach into the vicinity of identified or identifiable restricted areas. In order to determine whether or not the approaching UE may be on a trajectory that may encroach into identified and/or identifiable restricted areas, muting engine 102, in some embodiments can utilize, for instance, artificial intelligence technologies, neural networking architectures, collaborative filtering processes, machine learning techniques, and/or big data mining functionalities, wherein, for example, probabilistic determinations based at least in part on cost benefit analyses can be performed.

In additional and/or alternative other embodiments, the muting engine 102 can employ artificial intelligence technologies, neural networking architectures, collaborative filtering processes, machine learning techniques, Bayesian belief systems, big data mining and data analytic functionalities, and the like, wherein, for example, multi-objective optimization can be used to determine whether or not an action should be initiated and implemented. Multi-objective optimization can ensure that first actions or groups of first actions can only be implemented provided that other second actions or groups of other second actions are not detrimentally affected.

Muting engine 102, in order to track UE entering and/or exiting the control and/or the monitoring ambit of equipment associated with network equipment 100, can also use one or more global navigation satellite system (GNSS) equipment (e.g., global positioning system (GPS) that can provide geolocation and/or time information to GNSS equipment anywhere on or near the earth where there is an unobstructed line of sight to the one or more GNSS equipment, such as one or more GNSS satellites in various earth orbits.

Additionally and/or alternatively, muting engine 102, in some embodiments, can use other triangulation processes to keep track of UE. For instance, in various embodiments, methods for determining ranges (e.g., variable distances) by targeting UE with light amplification by stimulated emission of radiation and measuring the time for the reflected light to return to one or more receiver can be used to track UE approaching and/or entering into a determined vicinity of a restricted area. In a similar manner, muting engine 102 can use the facilities and/or functionalities of detection systems that use radio waves to determine the range, angle, or velocity of objects and to determine whether or not UE are approaching and/or entering into the determined vicinity of the restricted area.

Other mechanisms used by muting engine 102 to track UE can also include determining UE position based on the measurement of the time of arrival (TOA) of one or more energy wave having known waveforms and/or speed when propagating either from and/or to multiple emitters and/or receivers of the waves such as one or more network equipment (e.g., serving cell equipment, base station equipment, IoT equipment, picocell equipment, femtocell equipment, and similarly functional equipment). In some instances, a UE's returned signal strength values to various antennae associated with the one or mode network equipment (e.g., network equipment 100, serving cell equipment, base station equipment, IoT equipment, picocell equipment, femtocell equipment, and similarly functional equipment, . . . ) can be used to triangulate and provide positional references as to the trajectory of an individual UE.

Muting engine 102 based on determining that UE is approaching a restricted area can initiate processes to facilitate and/or effectuate the following tasks: (a) ensure that the serving cell equipment (or groups of serving cell equipment) tracking, monitoring, and/or controlling UE (e.g., aerial UE) is capable of providing beamforming functionalities, and where the serving cell equipment is capable of providing beamforming facilities further ensuring the serving cell equipment has enabled these beamforming facilities; (b) determine, or cause the serving cell equipment to determine, which beam of a collection of beams presently being emitted by the serving cell equipment is currently being used to monitor, service, and/or control the aerial UE; (c) determine, or cause the serving cell equipment to determine, one or more alternate beams, also being emitted by the serving cell equipment, that the aerial UE might use to proceed on its flight trajectory; (d) determine, or cause the serving cell equipment to determine, whether any of the one or more alternate beams will cause the aerial UE to approach and/or intrude into a defined or definable restricted area; (e) determine, or cause the serving cell equipment to determine, using, for instance, a cost benefit analysis, whether when a handover event occurs whether the handover event will cause a first serving cell equipment (e.g., the serving cell currently monitoring, tracking, and/or controlling the aerial UE) to handover responsibility for servicing the aerial UE to a second serving cell equipment, and whether such a handover will cause the aerial UE—for example, based at least in part on the relative beams being emitted from the first serving cell equipment—to become more proximate to the defined or definable restricted area (which can be a suboptimal outcome) or less proximate to the defined or definable restricted area (which can be a preferable outcome); (f) based on the determination that a possible handover event from the first serving cell equipment to the second serving cell equipment will bring the aerial UE into closer proximity to the defined or definable restricted area, exclude, or cause the first serving cell equipment to exclude selected beams from being emitted by the first serving cell equipment—preventing the emission of selected beams of the grouping of beams that will bring the aerial UE flight trajectory into the control ambit of the second serving cell equipment and consequently into closer proximity with the defined or definable restricted area; and (g) based on the emission of unselected beams that have not been excluded from emission by the first serving cell equipment, the aerial UE can alter its flight trajectory to use the facilities provided by a third serving cell equipment that is not in proximity with the defined or definable restricted area and whose plethora of beams will guide the aerial UE around the defined or definable restricted area.

In the foregoing manner, muting engine 102 can create a 5G technology based geofence around restricted areas for UE (e.g., aerial UE) served by terrestrial based LTE and/or 5G network equipment associated with MNOs. As has been observed earlier, restricted areas, in some embodiments, can be permanently restricted areas, such around airports, military bases, and identified governmental structures (e.g., parliamentary buildings, important governmental offices, and similar such structures). In other embodiments, the restricted areas and be contemporaneously and temporarily established, such as when special events are planned or are on-going during determined times, during times of national emergencies (e.g., localized disaster relief efforts, . . . ), and the like.

In view of the example system(s) described above, example method(s) that can be implemented in accordance with the disclosed subject matter can be better appreciated with reference to the flowcharts and/or illustrative time sequence charts in FIGS. 3-6. For purposes of simplicity of explanation, a example method disclosed herein is presented and described as a series of acts; however, it is to be understood and appreciated that the disclosure is not limited by the order of acts, as some acts may occur in different orders and/or concurrently with other acts from that shown and described herein. For example, one or more example methods disclosed herein could alternatively be represented as a series of interrelated states or events, such as in a state diagram. Moreover, interaction diagram(s) may represent methods in accordance with the disclosed subject matter when disparate entities enact disparate portions of the methods. Furthermore, not all illustrated acts may be required to implement a described example method in accordance with the subject specification. Further yet, the disclosed example method can be implemented in combination with one or more other methods, to accomplish one or more aspects herein described. It should be further appreciated that the example methods disclosed throughout the subject specification are capable of being stored on an article of manufacture (e.g., a computer-readable medium) to allow transporting and transferring such methods to computers for execution, and thus implementation, by a processor or for storage in a memory.

Figure 3:
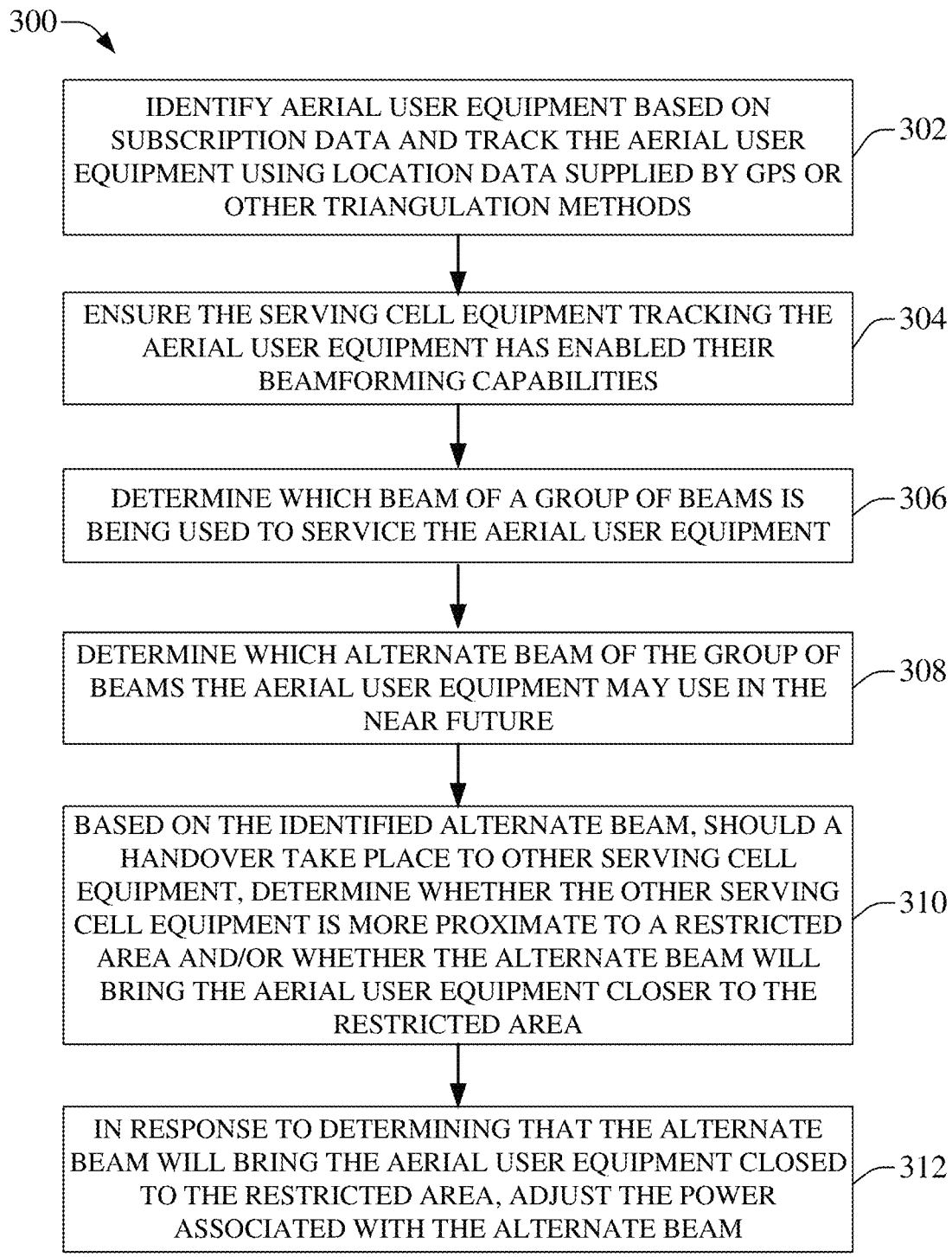
FIG. 3 provides illustration of a flow chart or method for dynamically creating technology based fifth generation geofences around defined or definable areas for UE, in particular aerial UE, while ensuring the safe operation of UE, in accordance with aspects of the subject disclosure.

FIG. 3 illustrates a flow chart or method 300 that can be used to dynamically create 5G technology based geofences around defined or definable areas for UE, in particular aerial UE, while ensuring the safe operation of UE. Method 300 can be used by central node global control equipment located on the core network. Examples of central node global control equipment can be MEC equipment, SON equipment, and/or RIC equipment.

Method 300 can commence at act 302 wherein central node global equipment (e.g., muting engine 102) can identify UE, and in particular aerial UE, based at least in part, for example, on IMSI values, or SIM values. Additionally and/or alternatively, at act 302, muting engine 102 can identify approaching UE based on other subscriber or subscription data, such as unique UE serial number values, governmentally issued unique identification values, such as federal aviation administration tag values, UE manufacturer serial number values, UE model number values, unique visual identification values affixed to UE, unique identification values rendered perceivable using, for example, irradiated ultra-violet light, and/or unique identification values rendered observable, for instance, through illumination using infra-red light.

At act 302, identification of approaching UE can be facilitated by muting engine 102 through use of one-dimensional and/or multi-dimensional scanning technologies and barcode symbology, such as UPCs, matrix bar codes comprising machine-readable optical labels, and the like that can include information about the equipment to which it is attached.

Further, at act 302, identification of approaching UE can be effectuated muting engine 102 by using computer-vision based recognition technologies, wherein one or more unique surface contours (or identifiable surface point patterns) of the approaching UE can be compared with repositories and databases of manufacture defined contours or determinable surface point patterns associated with UE.

At act 302, muting engine 102, having identified and/or detected approaching UE, can monitor and track the detected UE to determine whether or not the approaching UE is on a trajectory that may encroach into the vicinity of identified or identifiable restricted areas. In order to determine whether or not the approaching UE may be on a trajectory that may encroach into identified and/or identifiable restricted areas, at act 302, muting engine 102 can utilize, for instance, artificial intelligence technologies, neural networking architectures, collaborative filtering processes, machine learning techniques, and/or big data mining functionalities, wherein, for example, probabilistic determinations based at least in part on cost benefit analyses can be performed.

At act 302, muting engine 102 can also employ artificial intelligence technologies, neural networking architectures, collaborative filtering processes, machine learning techniques, Bayesian belief systems, big data mining and data analytic functionalities, and the like, wherein, for example, multi-objective optimization can be used to determine whether or not an action should be initiated and implemented. Multi-objective optimization can ensure that first actions or groups of first actions can only be implemented provided that other second actions or groups of other second actions are not detrimentally affected.

Additionally, at act 302, muting engine 102, in order to track UE entering and/or exiting the control and/or the monitoring ambit of equipment associated with network equipment 100, can also use one or more GNSS equipment that can provide geolocation and/or time information to GPS equipment anywhere on or near the earth where there is an unobstructed line of sight to the one or more GNSS equipment, such as one or more GPS satellites in various earth orbits.

Additionally and/or alternatively, muting engine 102, at act 302, can use other triangulation processes to keep track of UE. For instance, in various embodiments, methods for determining ranges (e.g., variable distances) by targeting UE with light amplification by stimulated emission of radiation and measuring the time for the reflected light to return to one or more receiver can be used to track UE approaching and/or entering into a determined vicinity of a restricted area. In a similar manner, muting engine 102 can use the facilities and/or functionalities of detection systems that use radio waves to determine the range, angle, or velocity of objects and to determine whether or not UE are approaching and/or entering into the determined vicinity of the restricted area.

Other mechanisms that can be used at act 302 to track UE can also include determining UE position based on the measurement of the TOA of one or more energy wave having known waveforms and/or speed when propagating either from and/or to multiple emitters and/or receivers of the waves such as one or more network equipment (e.g., serving cell equipment, base station equipment, IoT equipment, picocell equipment, femtocell equipment, and similarly functional equipment). In some instances, a UE's returned signal strength values to various antennae associated with the one or mode network equipment (e.g., network equipment 100, serving cell equipment, base station equipment, IoT equipment, picocell equipment, femtocell equipment, and similarly functional equipment, . . . ) can be used to triangulate and provide positional references as to the trajectory of an individual UE.

Muting engine 102 based at least in part on determining, at act 302, that UE is approaching a restricted area can initiate processes to facilitate and/or effectuate the following tasks. At act 304, muting engine can ensure that serving cell equipment currently servicing the identified aerial UE, or may in the future service the identified aerial UE, have beamforming capabilities and that those serving cell equipment have enabled their beamforming functionalities.

At act 306 muting engine 102, through the aegis of one or more serving cell equipment currently servicing the aerial UE, can determine which beam of a grouping of beams is currently being used to service the aerial UE. Thereafter, at 308 muting engine 102 can determine one or more alternate beams of the grouping of beams the aerial UE might use in the near term. At 310, muting engine 102, based on having identified an alternate beam of the grouping of beams and further having determined that a handover from a first serving cell equipment to a second serving cell equipment may take place, can determine whether the second serving cell equipment is more proximate to a restricted area and/or whether the alternate beam of the grouping of beams will bring the aerial UE closer to the restricted area. At act 312 muting engine 102 in response to determining that the alternate beam (and/or that if a handover occurs between the first serving cell equipment {e.g., the current serving cell equipment} to the second serving cell equipment) will bring the aerial UE into closer proximity to the restricted area, muting engine 102 can direct the current serving cell equipment to adjust the emission power associated with the alternate beam. In this manner the areal UE will be directed away from the restricted area.

As has been noted earlier, by adjusting (e.g., reducing and/or amplifying) the emission power of one or more beam of beams can prevent downlink (DL) signals emanating from serving cell equipment from reaching the identified aerial UE. SSB beam muting can prevent transmission of DL signals from networking equipment (e.g., serving cell equipment) to UE (e.g., both terrestrial based UE and/or aerial UE) within the broadcast coverage area in a defined direction relative to and/or around the networking equipment. SSB muting can cause UE within the broadcast coverage area of networking equipment to not receive DL transmission data (e.g., synchronization data, signal power data, physical cell identification data, beam identification data, and the like) from serving cell equipment. Typically, SSB beams are used to provide synchronization data, signal power data, physical cell identification data, beam identification data, and similar data to UE.

When aerial UE determine that no beam synchronization signal data in a given location and/or direction is available and/or has not been received, the aerial UE can adjust course to avoid what the aerial UE perceives as a coverage hole. In this manner aerial UE can be forced away from defined restricted areas.

Figure 4:
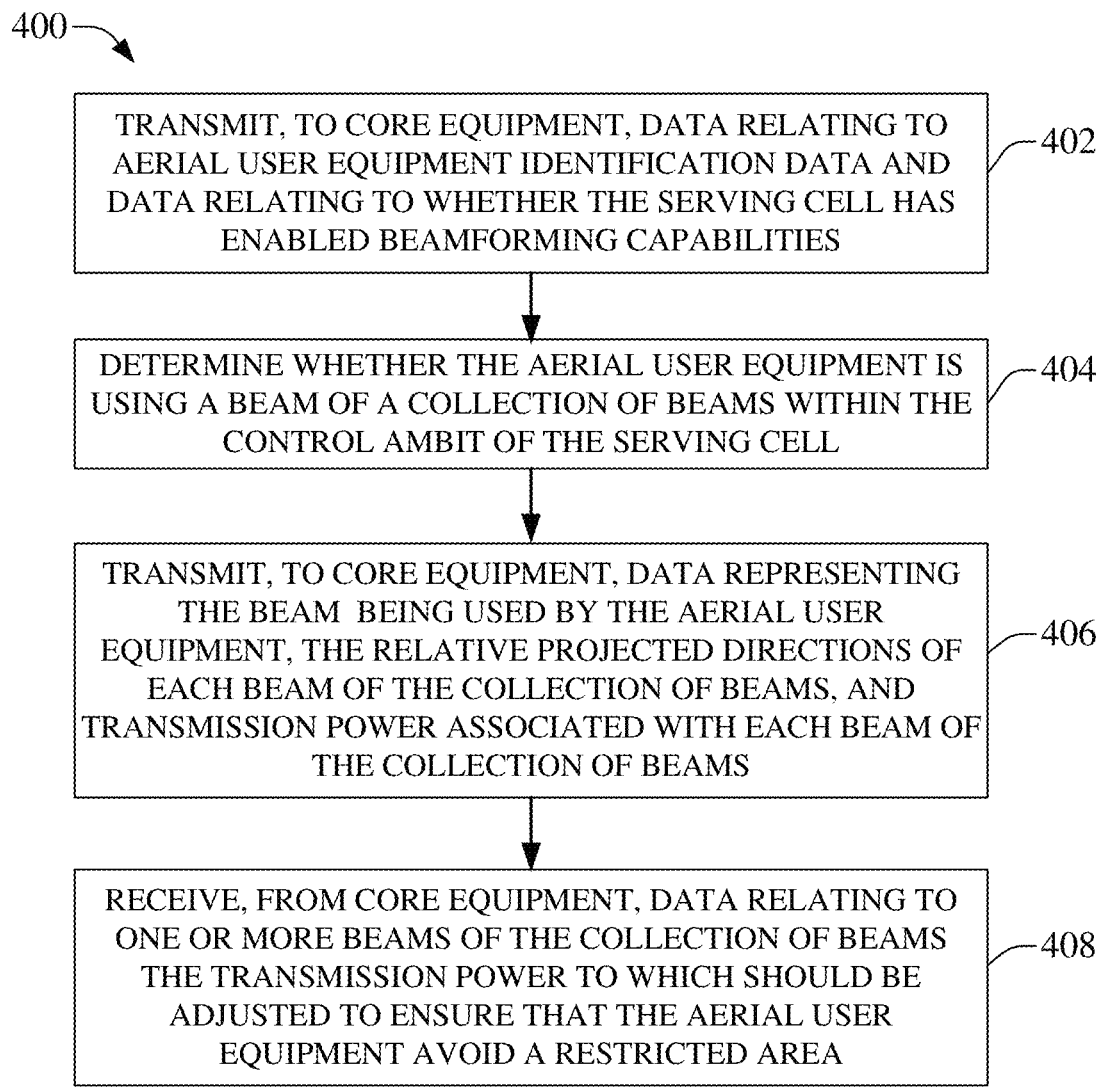
FIG. 4 provides illustration of a flow chart or method for dynamically creating technology based fifth generation geofences around defined or definable areas for UE, in particular aerial UE, while ensuring the safe operation of UE, in accordance with aspects of the subject disclosure.

FIG. 4 illustrates a flow chart or method 400 that can be used to dynamically create 5G technology based geofences around defined or definable areas for UE, in particular aerial UE, while ensuring the safe operation of UE. Method 400 can be used, for example, serving cell equipment that can be under the control of central node global control equipment located on the core network. Method 400 can commence at act 402 where serving cell equipment can transmit, to central node global control equipment, data relating to aerial UE identification data (e.g., IMSI values, SIM values, and the like). Additionally at act 402 serving cell equipment can transmit, to central node global control equipment, data pertaining to whether or not the serving cell equipment has beamforming capabilities, and if so, whether or not the serving cell has enabled its beamforming functionalities.

At act 402 serving cell equipment can identify aerial UE based on other subscriber or subscription data, such as unique UE serial number values, governmentally issued unique identification values, such as federal aviation administration tag values, UE manufacturer serial number values, UE model number values, unique visual identification values affixed to UE, unique identification values rendered perceivable using, for example, irradiated ultra-violet light, and/or unique identification values rendered observable, for instance, through illumination using infra-red light.

The serving cell equipment can also facilitate identification of approaching UE through use of one-dimensional and/or multi-dimensional scanning technologies and barcode symbologies, such as UPCs, matrix bar codes comprising machine-readable optical labels, and the like that can include information about the equipment to which it is attached. Further, serving cell equipment can also effectuate identification of approaching UE through utilization of computer-vision based recognition technologies, wherein one or more unique surface contours (or identifiable surface point patterns) of the approaching UE can be compared with repositories and databases of manufacture defined contours or determinable surface point patterns associated with UE.

Serving cell equipment, having identified and/or detected approaching UE, can monitor and track the detected UE to determine whether or not the approaching UE is on a trajectory that may bring the aerial UE into the vicinity of identified or identifiable restricted areas. In order to determine whether or not the approaching UE may be on a trajectory that may encroach into identified and/or identifiable restricted areas artificial intelligence technologies, neural networking architectures, collaborative filtering processes, machine learning techniques, and/or big data mining functionalities, wherein, for example, probabilistic determinations based at least in part on cost benefit analyses can be performed.

Other technologies that can be used include neural networking architectures, collaborative filtering processes, machine learning techniques, Bayesian belief systems, big data mining and data analytic functionalities, and the like, wherein, for example, multi-objective optimization can be used to determine whether or not an action should be initiated and implemented. Multi-objective optimization can ensure that first actions or groups of first actions can only be implemented provided that other second actions or groups of other second actions are not detrimentally affected.

In order to track UE entering and/or exiting the control and/or the monitoring ambit of serving cell equipment associated with network equipment 100, serving cell equipment can also use one or more GNSS equipment that can provide geolocation and/or time information to GPS equipment anywhere on or near the earth where there is an unobstructed line of sight to the one or more GNSS equipment, such as one or more GPS satellites in various earth orbits.

At act 404, serving cell equipment can determine whether the aerial UE is using one or more beams of a collection of beams that are being emitted by, and are under control of, the serving cell equipment. Serving cell equipment having determined that the aerial UE is using one or more beams of the collection of beams being emitted by the serving cell equipment can, at act 406, transmit, to core network equipment, data representing the one or more beam that is being used by the aerial UE, the relative projected directions of each of the one or more beams that are being emitted by the serving cell equipment, and the transmission power associated with each of the one or more beams.

At act 408, in response to transmitting, to core network equipment, data representing the beams of the collection of beams that are being used by the aerial UE, the relative projected directions of each of the beams of the collection of beams that are being emitted by the serving cell equipment, and the transmission power associated with each of the beams of the collection of beams, the serving cell equipment can receive from the core network equipment data comprising transmission power level values that should be used by serving cell equipment to adjust the emitted power associated with each of the beams of the collection of beams. The transmission power level values can cause the aerial UE to alter its flight trajectory to ensure that it avoids the restricted area.

Figure 5:
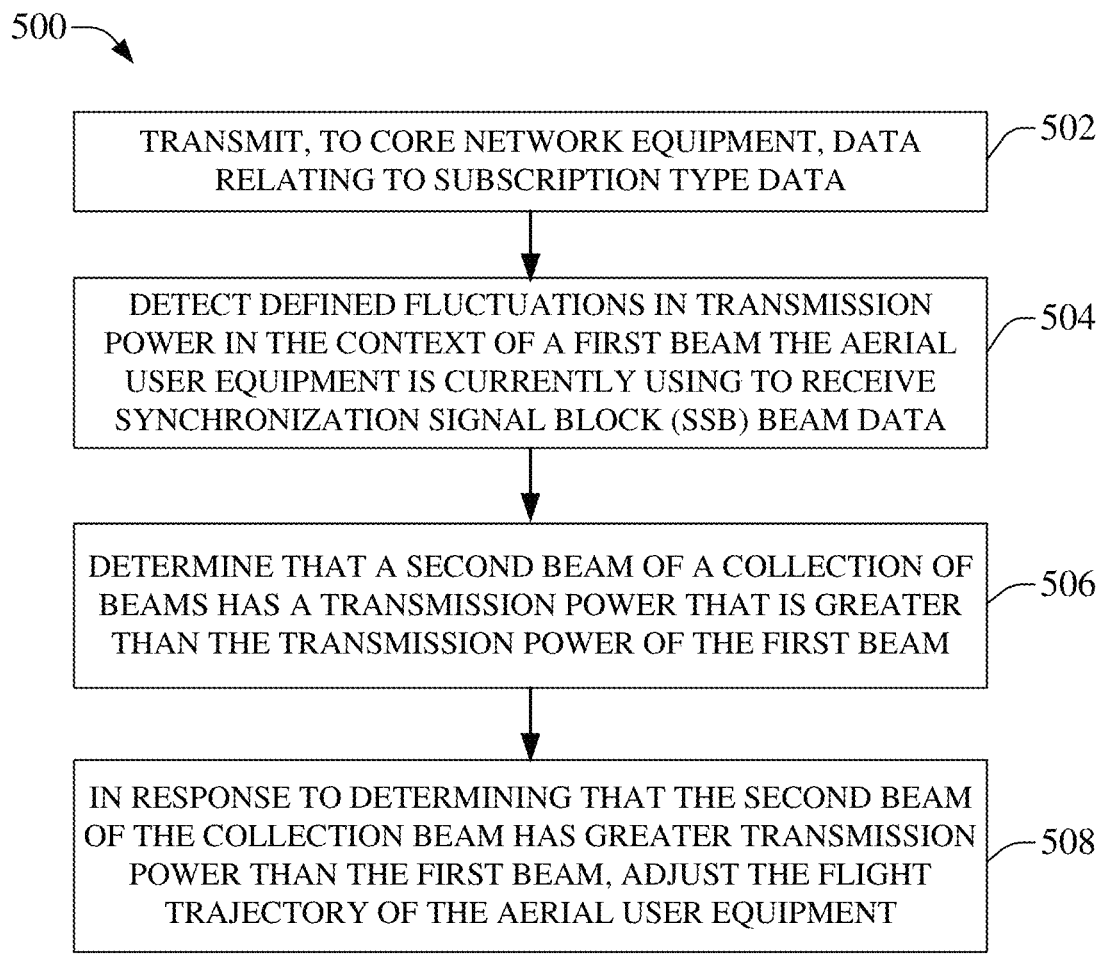
FIG. 5 provides illustration of a flow chart or method for dynamically creating technology based fifth generation geofences around defined or definable areas for UE, in particular aerial UE, while ensuring the safe operation of UE, in accordance with aspects of the subject disclosure.

FIG. 5 illustrates a flow chart or method 500 that can be used to dynamically create 5G technology based geofences around defined or definable areas for UE, in particular aerial UE, while ensuring the safe operation of UE. Method 500 can be executed, for example, by aerial UE in accordance with various described embodiments.

Method 500 can commence at act 502 wherein aerial UE can transmit, to core network equipment (e.g., central node global control equipment, serving cell equipment, and/or similar centralized networking equipment) data relating to subscription type data. Subscription type data can comprise, for instance, IMSI values, SIM values, unique UE serial number values, governmentally issued unique identification values, such as federal aviation administration tag values, UE manufacturer serial number values, UE model number values, unique visual identification values affixed to UE, unique identification values rendered perceivable using, for example, irradiated ultra-violet light, and/or unique identification values rendered observable, for instance, through illumination using infra-red light.

At act 504 the aerial UE can detect defined fluctuations in the transmission power in the context of a first beam of a group of beams that the aerial UE is currently using to receive SSB beam data. At act 506 the aerial UE can determine a second beam of the group of beams, wherein the second beam has a transmission power that is greater than the transmission power of the first beam of the group of beams. At act 508, based at least in part on, and/or in response to, determining that the second beam of the group of beams has a greater transmission power than the first beam of the group of beams, the aerial UE can alter its flight trajectory in order to avoid a defined or definable restricted area.

Figure 6:
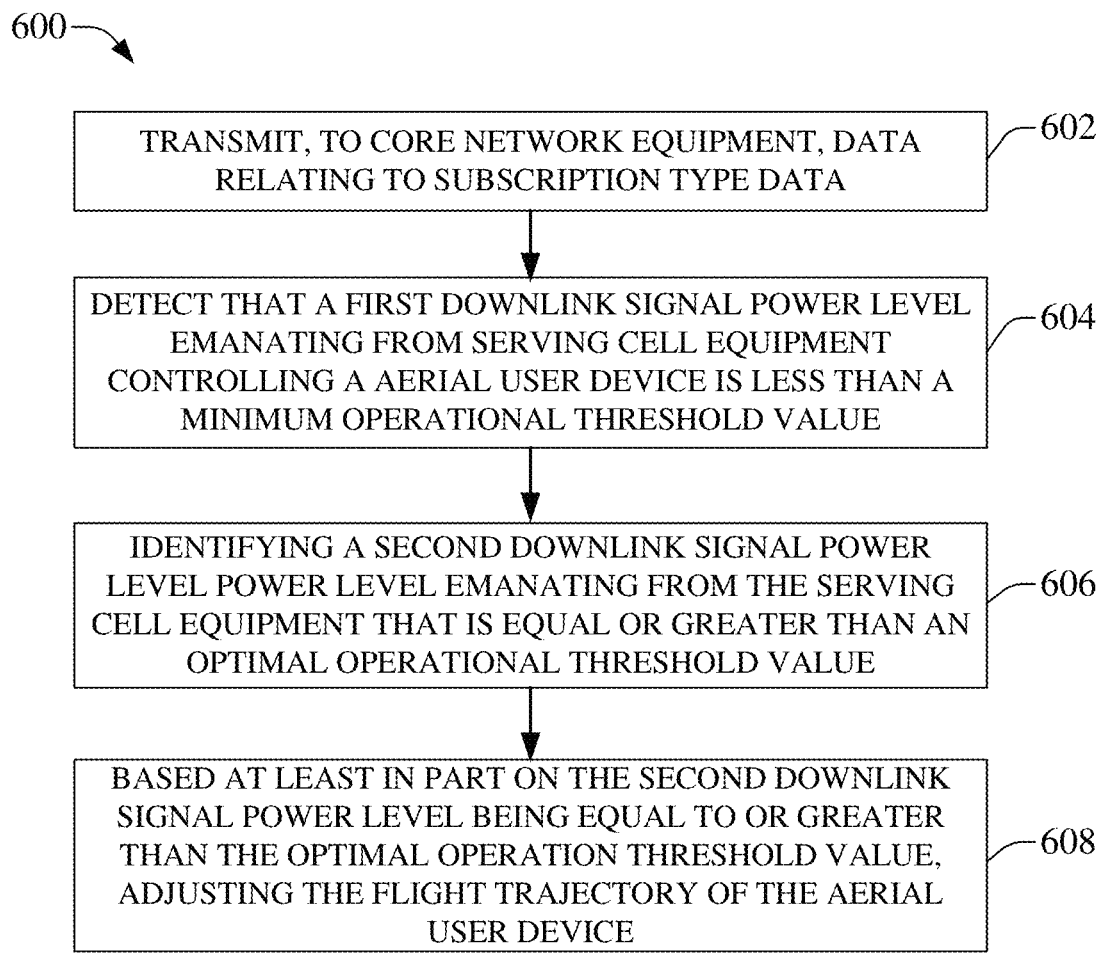
FIG. 6 provides depiction of a flow chart or method for dynamically creating technology based fifth generation geofences around defined or definable areas for UE, in particular aerial UE, while ensuring the safe operation of UE, in accordance with aspects of the subject disclosure.

FIG. 6 illustrates a flow chart or method 600 that can be used to dynamically create 5G technology based geofences around defined or definable areas for UE, in particular aerial UE, while ensuring the safe operation of UE. Method 600 can be implemented, for example, by aerial UE in accordance with various described embodiments.

Method 600 can commence at act 602 wherein aerial UE can transmit, to core network equipment (e.g., central node global control equipment, serving cell equipment, and/or similar centralized networking equipment) data relating to subscription type data. Subscription type data can comprise, for instance, IMSI values, SIM values, unique UE serial number values, governmentally issued unique identification values, such as federal aviation administration tag values, UE manufacturer serial number values, UE model number values, unique visual identification values affixed to UE, unique identification values rendered perceivable using, for example, irradiated ultra-violet light, and/or unique identification values rendered observable, for instance, through illumination using infra-red light.

At act 604 aerial UE can determine that a first DL signal power level associated with a first beam of beams emanating from serving cell equipment currently monitoring, tracking, and/or providing service to the aerial UE is less than a defined minimum operational threshold level needed to safely continue on its current flight trajectory. In response to determining that the first DL signal power level associated with the first beam of beams is less than satisfactory to continue on its current flight trajectory, at 606 aerial UE can identify a second DL signal power level associated with a second beam of beams emanating from the serving cell equipment, the second DL power level being equal to or great than an optimal operating threshold value necessary for the aerial UE to continue operational flight. At 608 the aerial UE, in response to, and/or based at least in part on, the second DL power level being equal to or great than the optimal operating threshold value, can alter its flight trajectory to avoid defined or definable restricted areas.

Figure 7:
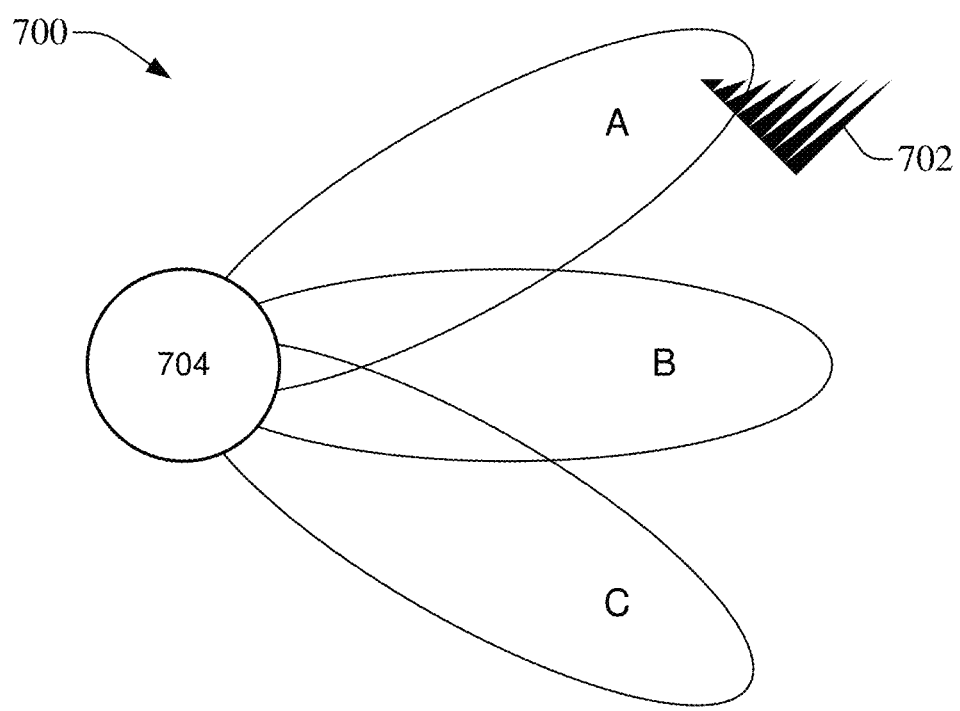
FIG. 7 depicts a scenario where an aerial UE is being serviced by a first beam of a group of beams formed and/or emitted by serving cell equipment, in accordance with aspects of the subject disclosure.

FIG. 7 depicts a scenario 700 where an aerial UE 702 is being serviced by beam A of a group of beams (e.g., beam A, beam B, and beam C) formed and/or emitted by serving cell equipment 704. In this instance, aerial UE 702 is receiving, via Beam A, SSB data comprising synchronization data, signal power data, physical cell identification data, and beam identification data. Aerial UE 702 can use the SSB data and the beam that is servicing it (e.g., beam A) to travel along a flight path between a start location and destination location. For instance, the start location can be a package warehouse where goods are stored and the destination location can be a delivery site for one or more packages retrieved from the package ware house.

At some time point in the near future the serving cell equipment in conjunction with core networking equipment can determine that aerial UE is getting too proximate to a restricted area (e.g. that a defined restricted area lies proximate to, and in the general direction, of beam B; should the aerial UE be handed over to beam B it is more likely than not that the aerial UE may enter the defined restricted area). In response to determining that aerial UE may be handed over to serving cell equipment that can lie in the general direction pointed to by beam B, core networking equipment in collaboration with the current serving cell equipment can implement the following acts: (i) determine that serving cell equipment currently servicing the aerial UE, or may in the future service the identified aerial UE, have beamforming capabilities and that those serving cell equipment have enabled their beamforming functionalities; (ii) determine which beam of a grouping of beams is currently being used to service the aerial UE; (iii) determine one or more alternate beams of the grouping of beams the aerial UE might use in the near term; (iv) in response to having identified alternate beams of the grouping of beams, and further having determined that a handover from a first serving cell equipment (e.g., current serving cell equipment) to a second serving cell equipment may take place, determine whether or not the second serving cell equipment is more proximate to a restricted area and/or whether the alternate beams of the grouping of beams will bring the aerial UE closer to the restricted area; and (v) based on determining that the alternate beams (and/or that if a handover may take place between the first serving cell equipment to the second serving cell equipment) will bring the aerial UE into closer proximity to the restricted area, instruct the current serving cell equipment to adjust the emission power associated with the alternate beams. In this manner the areal UE will be directed away from the restricted area.

Figure 8:
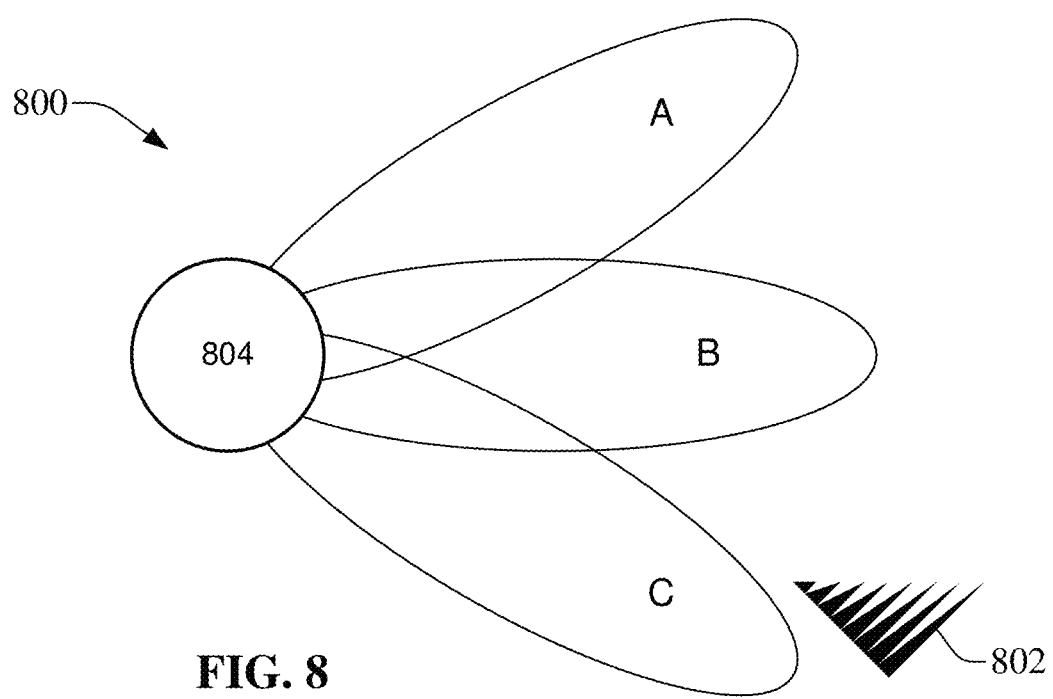
FIG. 8 depicts a scenario where an aerial UE is being serviced by a second beam of a group of beams formed and/or emitted by serving cell equipment, in accordance with aspects of the subject disclosure.

As has been noted earlier, by adjusting (e.g., reducing and/or amplifying) the emission power of one or more beam of beams can prevent downlink (DL) signals emanating from serving cell equipment from reaching the identified aerial UE. SSB beam muting can prevent transmission of DL signals from networking equipment (e.g., serving cell equipment) to UE (e.g., both terrestrial based UE and/or aerial UE) within the broadcast coverage area in a defined direction relative to and/or around the networking equipment. SSB muting can cause UE within the broadcast coverage area of networking equipment to not receive DL transmission data (e.g., synchronization data, signal power data, physical cell identification data, beam identification data, and the like) from serving cell equipment. Typically, SSB beams are used to provide synchronization data, signal power data, physical cell identification data, beam identification data, and similar data to UE. Accordingly, when aerial UE determine that no beam synchronization signal data in a given location and/or direction is available and/or has not been received, the aerial UE can adjust course to avoid what the aerial UE perceives as a coverage hole. This is illustrated in FIG. 8 wherein aerial UE 802 has avoided using beam B (an alternate beam or a secondary beam) because the emitted power associated with beam B has been adjusted (e.g., reduced below a threshold value or boosted over the emitted power levels of the other beams comprising the group of beams) to have aerial UE 802 be attached to beam C (a tertiary beam) rather than beam B in order to obtain synchronization data, signal power data, physical cell identification data, beam identification data, and similar data (e.g., SSB data) in order for aerial UE 802 to continue its flight trajectory.

In regard to the foregoing disclosure, it should be noted that central node global control equipment can collect key performance indicator (KPI) values returned to, or received by, serving cell equipment (or central node global control equipment) by UE (terrestrial based and/or aerial) located within the coverage ambit of serving cell equipment. Examples of KPI values that can be returned by UE to serving cell equipment can include: values associated with RSRP measurement values, received signal strength indicator (RSSI) measurement values, quality of service (QoS) metric values, signal to noise ratio (SNR) values, received signal code power (RSCP) values, signal to interference ratio (SIR) values, signal to interference plus noise ratio (SINR) values, distance measurement values (e.g., determined based on global positioning satellite (GPS) data, geo-location data, geo-tag data, or other such relevant positioning data) indicating distances between UE and serving cell equipment, distance measurement values indicating distances between UE and respective neighboring serving cell equipment, or other similarly appropriate values. As has been noted, KPI values can be values that can have been periodically returned within measurement reports by UE extant within the control and/or coverage ambit associated with network equipment, such as serving cell equipment, neighboring serving cell equipment, or similar network equipment.

Many use cases of unmanned aerial vehicles (UAVs), such as drones, require beyond visual line of sight (LOS) communications. Mobile networks can offer wide area, high speed, and secure wireless connectivity, which can enhance control and safety of UAV operations and enable beyond visual LOS use cases. Existing long term evolution (LTE) networks can support initial drone deployments. LTE evolution and 5G can provide more efficient connectivity for wide-scale drone deployments. New and exciting applications for drones are being envisioned and are emerging. These envisioned and prospective applications can be a potential boon for mobile network operator entities. Use cases of commercial UAVs are growing rapidly, including delivery, communications and media, inspection of critical infrastructure, surveillance, search-and-rescue operations, agriculture, and similar worthy endeavors.

Research and development of current mobile broadband communication (e.g., LTE) has been primarily devoted to terrestrial based communication. Providing tether-less broadband connectivity for UAVs is an emerging field.

Figure 9:
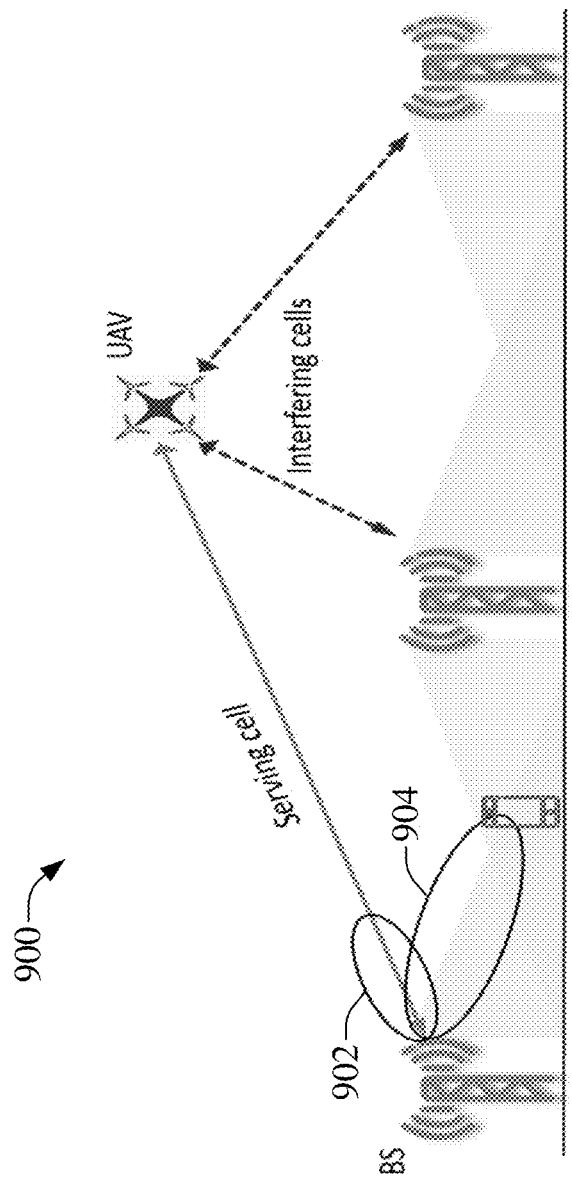
FIG. 9 provides illustration of how network equipment antenna direction affects aerial user equipment, in accordance with aspects of the subject disclosure.

One main aspect that makes using LTE to serve UAVs challenging is the fact that mobile LTE networks are generally optimized for terrestrial broadband communication. Thus, the antennas associated with terrestrial based serving equipment (such as base station equipment, eNodeB equipment, eNB equipment, gNodeB equipment, picocell equipment, macrocell equipment, microcell equipment, femtocell equipment, IoT equipment operating as mobile network operation (MNO) network equipment, access point equipment, and the like) are typically down-tilted to reduce the interference power levels to other serving cell equipment. With down tilted antennas, small UAVs may thus only be served by transmission or broadcast side lobes of the antennas associated with terrestrial based serving cell equipment. FIG. 9 illustrates the broadcast disparity between the down-tilted antennas 902 and side lobes 904.

Due to the presence of possible voids or nulls in the transmission side lobes 904, and due to close-to-free-space propagation in the sky, aerial UAVs or aerial UEs can detect several ground-based serving cell equipment within a defined geographical area. In addition, aerial UE, since they typically are positioned above terrestrial based radio equipment and above radio signal echo (e.g., radio clutter) emanating from serving cell equipment, can detect stronger signals from distant serving cell equipment (e.g., interfering cells) than terrestrial based UE that are more geographically proximate. Thus, aerial UE can be served by much more distant serving cell equipment (e.g., interfering cells) instead of the most proximate serving cell equipment.

Figure 10:
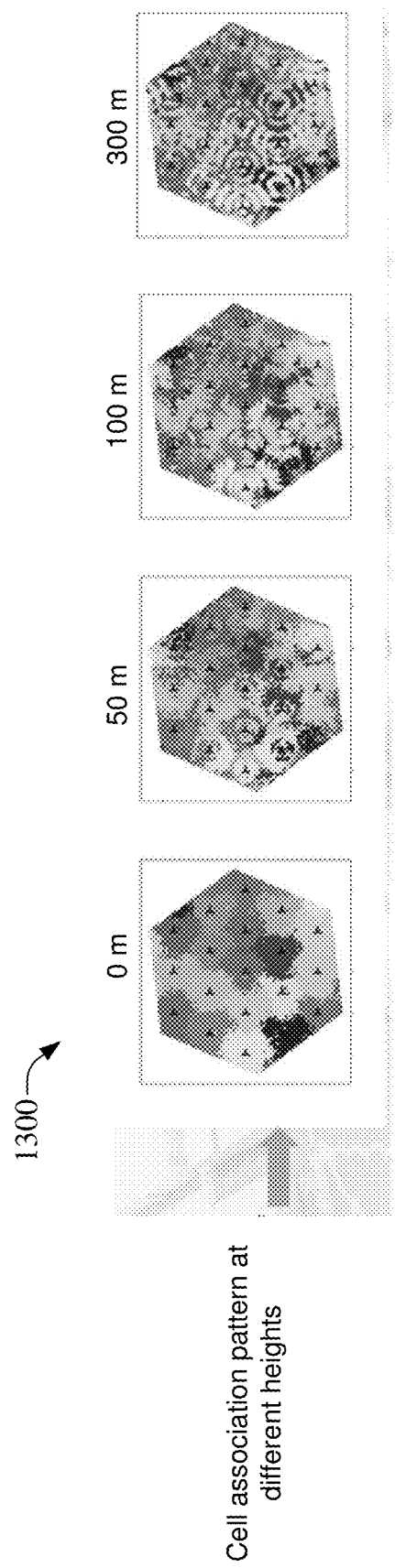
FIG. 10 provides depiction of network equipment association patterns at different altitudes, in accordance with aspects of the subject disclosure.

FIG. 10 provides depiction of the relative disparities in coverage areas between terrestrial coverage areas and aerial coverage areas. In FIG. 10 it will be observed, that at lesser heights, for example, at 0 meters (m) the broadcast coverage area pattern of network cell equipment is generally distinct and clear; the coverage areas being defined clusters around one or more central point associated with respective network cell equipment. However, at greater heights (e.g., 50 m, 100 m, 300 m) above terrain the coverage areas associated with respective network equipment become less and less well defined and more and more amorphous.

Figure 11:
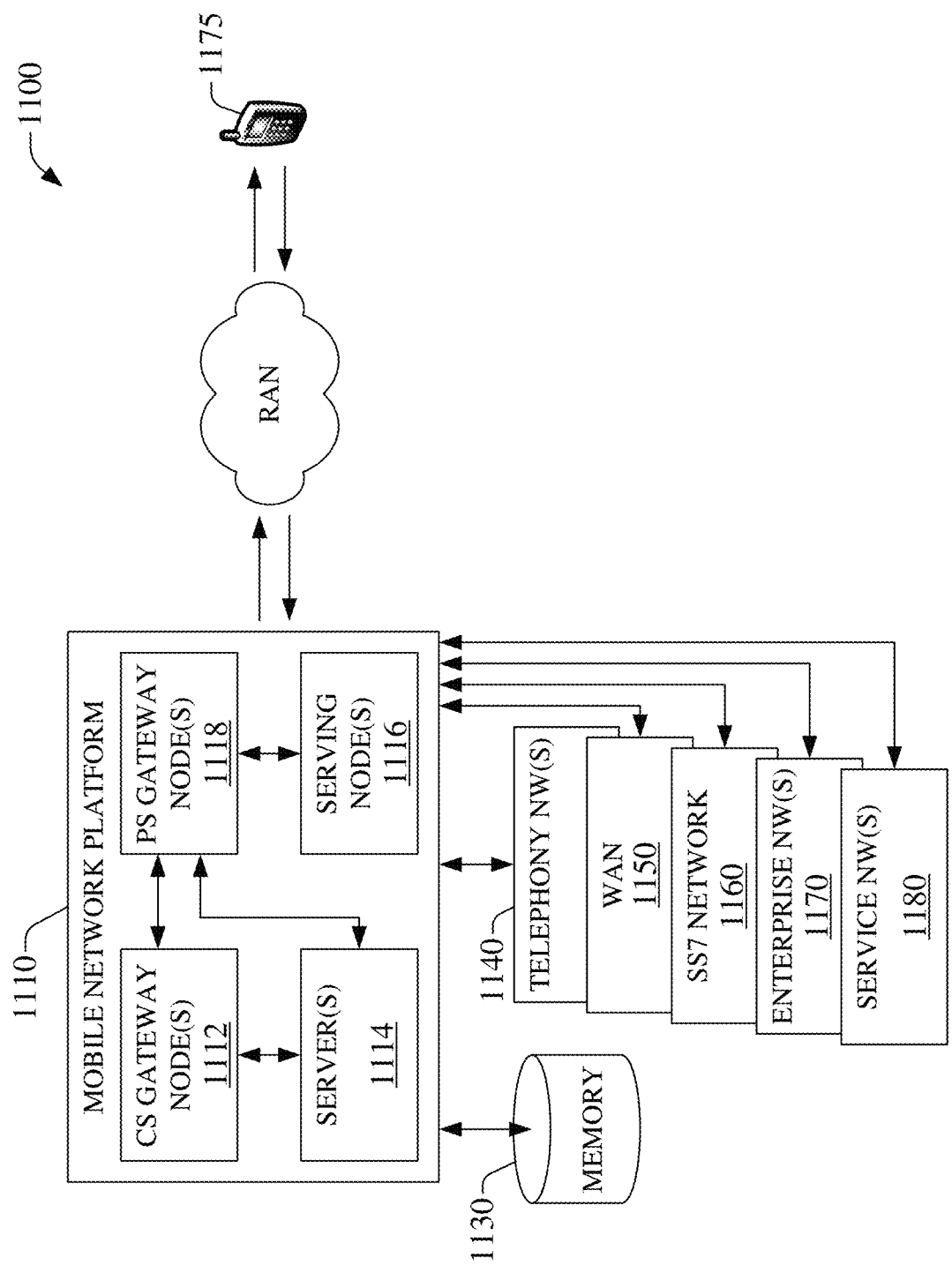
FIG. 11 is a block diagram of an example embodiment of a mobile network platform to implement and exploit various features or aspects of the subject disclosure.

FIG. 11 presents an example embodiment 1100 of a mobile network platform 1110 that can implement and exploit one or more aspects of the disclosed subject matter described herein. Generally, wireless network platform 1110 can include components, e.g., nodes, gateways, interfaces, servers, or disparate platforms, that facilitate both packet-switched (PS) (e.g., internet protocol (IP), frame relay, asynchronous transfer mode (ATM)) and circuit-switched (CS) traffic (e.g., voice and data), as well as control generation for networked wireless telecommunication. As a non-limiting example, wireless network platform 1110 can be included in telecommunications carrier networks, and can be considered carrier-side components as discussed elsewhere herein. Mobile network platform 1110 includes CS gateway node(s) 1112 which can interface CS traffic received from legacy networks like telephony network(s)

1140 (e.g., public switched telephone network (PSTN), or public land mobile network (PLMN)) or a signaling system #7 (SS7) network 1170. Circuit switched gateway node(s) 1112 can authorize and authenticate traffic (e.g., voice) arising from such networks. Additionally, CS gateway node(s) 1112 can access mobility, or roaming, data generated through SS7 network 1160; for instance, mobility data stored in a visited location register (VLR), which can reside in memory 1130. Moreover, CS gateway node(s) 1112 interfaces CS-based traffic and signaling and PS gateway node(s) 1118. As an example, in a 3GPP UMTS network, CS gateway node(s) 1112 can be realized at least in part in gateway GPRS support node(s) (GGSN). It should be appreciated that functionality and specific operation of CS gateway node(s) 1112, PS gateway node(s) 1118, and serving node(s) 1116, is provided and dictated by radio technology(ies) utilized by mobile network platform 1110 for telecommunication.

In addition to receiving and processing CS-switched traffic and signaling, PS gateway node(s) 1118 can authorize and authenticate PS-based data sessions with served mobile devices. Data sessions can include traffic, or content(s), exchanged with networks external to the wireless network platform 1110, like wide area network(s) (WANs) 1150, enterprise network(s) 1170, and service network(s) 1180, which can be embodied in local area network(s) (LANs), can also be interfaced with mobile network platform 1110 through PS gateway node(s) 1118. It is to be noted that WANs 1150 and enterprise network(s) 1170 can embody, at least in part, a service network(s) like IP multimedia subsystem (IMS). Based on radio technology layer(s) available in technology resource(s) 1117, packet-switched gateway node(s) 1118 can generate packet data protocol contexts when a data session is established; other data structures that facilitate routing of packetized data also can be generated. To that end, in an aspect, PS gateway node(s) 1118 can include a tunnel interface (e.g., tunnel termination gateway (TTG) in 3GPP UMTS network(s) (not shown)) which can facilitate packetized communication with disparate wireless network(s), such as Wi-Fi networks.

In embodiment 1100, wireless network platform 1110 also includes serving node(s) 1116 that, based upon available radio technology layer(s) within technology resource(s) 1117, convey the various packetized flows of data streams received through PS gateway node(s) 1118. It is to be noted that for technology resource(s) 1117 that rely primarily on CS communication, server node(s) can deliver traffic without reliance on PS gateway node(s) 1118; for example, server node(s) can embody at least in part a mobile switching center. As an example, in a 3GPP UMTS network, serving node(s) 1116 can be embodied in serving GPRS support node(s) (SGSN).

For radio technologies that exploit packetized communication, server(s) 1114 in wireless network platform 1110 can execute numerous applications that can generate multiple disparate packetized data streams or flows, and manage (e.g., schedule, queue, format . . . ) such flows. Such application(s) can include add-on features to standard services (for example, provisioning, billing, customer support . . . ) provided by wireless network platform 1110. Data streams (e.g., content(s) that are part of a voice call or data session) can be conveyed to PS gateway node(s) 1118 for authorization/authentication and initiation of a data session, and to serving node(s) 1116 for communication thereafter. In addition to application server, server(s) 1114 can include utility server(s), a utility server can include a provisioning server, an operations and maintenance server, a security server that can implement at least in part a certificate authority and firewalls as well as other security mechanisms, and the like. In an aspect, security server(s) secure communication served through wireless network platform 1110 to ensure network's operation and data integrity in addition to authorization and authentication procedures that CS gateway node(s) 1112 and PS gateway node(s) 1118 can enact. Moreover, provisioning server(s) can provision services from external network(s) like networks operated by a disparate service provider; for instance, WAN 1150 or Global Positioning System (GPS) network(s) (not shown). Provisioning server(s) can also provision coverage through networks associated to wireless network platform 1110 (e.g., deployed and operated by the same service provider), such as femto-cell network(s) (not shown) that enhance wireless service coverage within indoor confined spaces and offload radio access network resources in order to enhance subscriber service experience within a home or business environment by way of UE 1175.

It is to be noted that server(s) 1114 can include one or more processors configured to confer at least in part the functionality of macro network platform 1110. To that end, the one or more processor can execute code instructions stored in memory 1130, for example. It is should be appreciated that server(s) 1114 can include a content manager 1115, which operates in substantially the same manner as described hereinbefore.

In example embodiment 1100, memory 1130 can store information related to operation of wireless network platform 1110. Other operational information can include provisioning information of mobile devices served through wireless platform network 1110, subscriber databases; application intelligence, pricing schemes, e.g., promotional rates, flat-rate programs, couponing campaigns; technical specification(s) consistent with telecommunication protocols for operation of disparate radio, or wireless, technology layers; and so forth. Memory 1130 can also store information from at least one of telephony network(s) 1140, WAN 1150, enterprise network(s) 1170, or SS7 network 1160. In an aspect, memory 1130 can be, for example, accessed as part of a data store component or as a remotely connected memory store.

Figure 12:
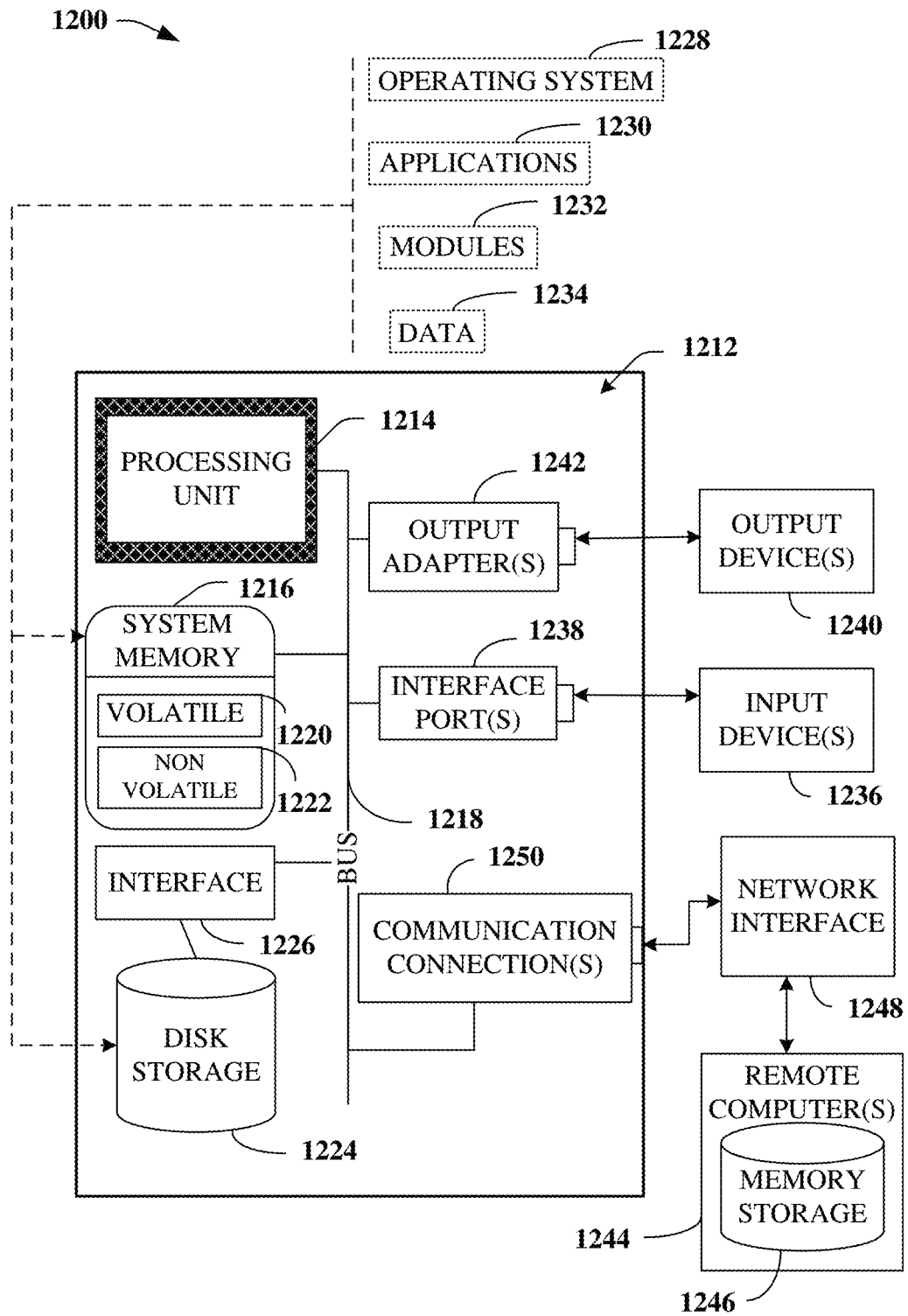
FIG. 12 illustrates a block diagram of a computing system operable to execute the disclosed example embodiments.

In order to provide a context for the various aspects of the disclosed subject matter, FIG. 12, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules include routines, programs, components, data structures, etc. that perform particular tasks and/or implement particular abstract data types.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can include both volatile and nonvolatile memory, by way of illustration, and not limitation, volatile memory 1220 (see below), non-volatile memory 1222 (see below), disk storage 1224 (see below), and memory storage 1246 (see below). Further, nonvolatile memory can be included in read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Moreover, it will be noted that the disclosed subject matter can be practiced with other computer system configurations, including single-processor or multiprocessor computer systems, mini-computing devices, mainframe computers, as well as personal computers, hand-held computing devices (e.g., PDA, phone, watch, tablet computers, netbook computers, . . . ), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

FIG. 12 illustrates a block diagram of a computing system 1200 operable to execute one or more parts of one or more of the disclosed example embodiments. Computer 1212, which can be, for example, part of the hardware of system 100, includes a processing unit 1214, a system memory 1216, and a system bus 1218. System bus 1218 couples system components including, but not limited to, system memory 1216 to processing unit 1214. Processing unit 1214 can be any of various available processors. Dual microprocessors and other multiprocessor architectures also can be employed as processing unit 1214.

System bus 1218 can be any of several types of bus structure(s) including a memory bus or a memory controller, a peripheral bus or an external bus, and/or a local bus using any variety of available bus architectures including, but not limited to, Industrial Standard Architecture (ISA), Micro-Channel Architecture (MSA), Extended ISA (EISA), Intelligent Drive Electronics, VESA Local Bus (VLB), Peripheral Component Interconnect, Card Bus, Universal Serial Bus (USB), Advanced Graphics Port (AGP), Personal Computer Memory Card International Association bus (PCMCIA), Firewire (IEEE 1394), and Small Computer Systems Interface (SCSI).

System memory 1216 can include volatile memory 1220 and nonvolatile memory 1222. A basic input/output system (BIOS), containing routines to transfer information between elements within computer 1212, such as during start-up, can be stored in nonvolatile memory 1222. By way of illustration, and not limitation, nonvolatile memory 1222 can include ROM, PROM, EPROM, EEPROM, or flash memory. Volatile memory 1220 includes RAM, which acts as external cache memory. By way of illustration and not limitation, RAM is available in many forms such as SRAM, dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM).

Computer 1212 can also include removable/non-removable, volatile/non-volatile computer storage media. FIG. 12 illustrates, for example, disk storage 1224. Disk storage 1224 includes, but is not limited to, devices like a magnetic disk drive, floppy disk drive, tape drive, flash memory card, or memory stick. In addition, disk storage 1224 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1224 to system bus 1218, a removable or non-removable interface is typically used, such as interface 1226.

Computing devices typically include a variety of media, which can include computer-readable storage media or communications media, which two terms are used herein differently from one another as follows.

Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible media which can be used to store desired information. In this regard, the term "tangible" herein as may be applied to storage, memory or computer-readable media, is to be understood to exclude only propagating intangible signals per se as a modifier and does not relinquish coverage of all standard storage, memory or computer-readable media that are not only propagating intangible signals per se. In an aspect, tangible media can include non-transitory media wherein the term "non-transitory" herein as may be applied to storage, memory or computer-readable media, is to be understood to exclude only propagating transitory signals per se as a modifier and does not relinquish coverage of all standard storage, memory or computer-readable media that are not only propagating transitory signals per se. For the avoidance of doubt, the term "computer-readable storage device" is used and defined herein to exclude transitory media. Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

It can be noted that FIG. 12 describes software that acts as an intermediary between users and computer resources described in suitable operating environment 1200. Such software includes an operating system 1228. Operating system 1228, which can be stored on disk storage 1224, acts to control and allocate resources of computer system 1212. System applications 1230 take advantage of the management of resources by operating system 1228 through program modules 1232 and program data 1234 stored either in system memory 1216 or on disk storage 1224. It is to be noted that the disclosed subject matter can be implemented with various operating systems or combinations of operating systems.

A user can enter commands or information into computer 1212 through input device(s) 1236. As an example, mobile device and/or portable device can include a user interface embodied in a touch sensitive display panel allowing a user to interact with computer 1212. Input devices 1236 include, but are not limited to, a pointing device such as a mouse, trackball, stylus, touch pad, keyboard, microphone, joystick, game pad, satellite dish, scanner, TV tuner card, digital camera, digital video camera, web camera, cell phone, smartphone, tablet computer, etc. These and other input devices connect to processing unit 1214 through system bus 1218 by way of interface port(s) 1238. Interface port(s) 1238 include, for example, a serial port, a parallel port, a game port, a universal serial bus (USB), an infrared port, a Bluetooth port, an IP port, or a logical port associated with a wireless service, etc. Output device(s) 1240 use some of the same type of ports as input device(s) 1236.

Thus, for example, a USB port can be used to provide input to computer 1212 and to output information from computer 1212 to an output device 1240. Output adapter 1242 is provided to illustrate that there are some output devices 1240 like monitors, speakers, and printers, among other output devices 1240, which use special adapters. Output adapters 1242 include, by way of illustration and not limitation, video and sound cards that provide means of connection between output device 1240 and system bus 1218. It should be noted that other devices and/or systems of devices provide both input and output capabilities such as remote computer(s) 1244.

Computer 1212 can operate in a networked environment using logical connections to one or more remote computers, such as remote computer(s) 1244. Remote computer(s) 1244 can be a personal computer, a server, a router, a network PC, cloud storage, cloud service, a workstation, a microprocessor based appliance, a peer device, or other common network node and the like, and typically includes many or all of the elements described relative to computer 1212.

For purposes of brevity, only a memory storage device 1246 is illustrated with remote computer(s) 1244. Remote computer(s) 1244 is logically connected to computer 1212 through a network interface 1248 and then physically connected by way of communication connection 1250. Network interface 1248 encompasses wire and/or wireless communication networks such as local-area networks (LAN) and wide-area networks (WAN). LAN technologies include Fiber Distributed Data Interface (FDDI), Copper Distributed Data Interface (CDDI), Ethernet, Token Ring and the like. WAN technologies include, but are not limited to, point-to-point links, circuit-switching networks like Integrated Services Digital Networks (ISDN) and variations thereon, packet switching networks, and Digital Subscriber Lines (DSL). As noted below, wireless technologies may be used in addition to or in place of the foregoing.

Communication connection(s) 1250 refer(s) to hardware/software employed to connect network interface 1248 to bus 1218. While communication connection 1250 is shown for illustrative clarity inside computer 1212, it can also be external to computer 1212. The hardware/software for connection to network interface 1248 can include, for example, internal and external technologies such as modems, including regular telephone grade modems, cable modems and DSL modems, ISDN adapters, and Ethernet cards.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can include both volatile and nonvolatile memory.

As used in this application, the terms "component," "system," "platform," "layer," "selector," "interface," and the like are intended to refer to a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media, device readable storage devices, or machine readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can include a processor therein to execute software or firmware that confers at least in part the functionality of the electronic components.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form.

Moreover, terms like "user equipment (UE)," "mobile station," "mobile," subscriber station," "subscriber equipment," "access terminal," "terminal," "handset," and similar terminology, refer to a wireless device utilized by a subscriber or user of a wireless communication service to receive or convey data, control, voice, video, sound, gaming, or substantially any data-stream or signaling-stream. The foregoing terms are utilized interchangeably in the subject specification and related drawings. Likewise, the terms "access point (AP)," "base station," "NodeB," "evolved Node B (eNodeB)," "home Node B (HNB)," "home access point (HAP)," "cell device," "sector," "cell," and the like, are utilized interchangeably in the subject application, and refer to a wireless network component or appliance that serves and receives data, control, voice, video, sound, gaming, or substantially any data-stream or signaling-stream to and from a set of subscriber stations or provider enabled devices. Data and signaling streams can include packetized or frame-based flows.

Additionally, the terms "core-network", "core", "core carrier network", "carrier-side", or similar terms can refer to components of a telecommunications network that typically provides some or all of aggregation, authentication, call control and switching, charging, service invocation, or gateways. Aggregation can refer to the highest level of aggregation in a service provider network wherein the next level in the hierarchy under the core nodes is the distribution networks and then the edge networks. UEs do not normally connect directly to the core networks of a large service provider but can be routed to the core by way of a switch or radio area network. Authentication can refer to determinations regarding whether the user requesting a service from the telecom network is authorized to do so within this network or not. Call control and switching can refer determinations related to the future course of a call stream across carrier equipment based on the call signal processing. Charging can be related to the collation and processing of charging data generated by various network nodes. Two common types of charging mechanisms found in present day networks can be prepaid charging and postpaid charging. Service invocation can occur based on some explicit action (e.g. call transfer) or implicitly (e.g., call waiting). It is to be noted that service "execution" may or may not be a core network functionality as third party network/nodes may take part in actual service execution. A gateway can be present in the core network to access other networks. Gateway functionality can be dependent on the type of the interface with another network.

Furthermore, the terms "user," "subscriber," "customer," "consumer," "prosumer," "agent," and the like are employed interchangeably throughout the subject specification, unless context warrants particular distinction(s) among the terms. It should be appreciated that such terms can refer to human entities or automated components (e.g., supported through artificial intelligence, as through a capacity to make inferences based on complex mathematical formalisms), that can provide simulated vision, sound recognition and so forth.

Aspects, features, or advantages of the subject matter can be exploited in substantially any, or any, wired, broadcast, wireless telecommunication, radio technology or network, or combinations thereof. Non-limiting examples of such technologies or networks include Geocast technology; broadcast technologies (e.g., sub-Hz, ELF, VLF, LF, MF, HF, VHF, UHF, SHF, THz broadcasts, etc.); Ethernet; X.25; powerline-type networking (e.g., PowerLine AV Ethernet, etc.); femto-cell technology; Wi-Fi; Worldwide Interoperability for Microwave Access (WiMAX); Enhanced General Packet Radio Service (Enhanced GPRS); Third Generation Partnership Project (3GPP or 3G) LTE; 3GPP Universal Mobile Telecommunications System (UMTS) or 3GPP UMTS; Third Generation Partnership Project 2 (3GPP2) Ultra Mobile Broadband (UMB); High Speed Packet Access (HSPA); High Speed Downlink Packet Access (HSDPA); High Speed Uplink Packet Access (HSUPA); GSM Enhanced Data Rates for GSM Evolution (EDGE) Radio Access Network (RAN) or GERAN; UMTS Terrestrial Radio Access Network (UTRAN); or LTE Advanced.

What has been described above includes examples of embodiments illustrative of the disclosed subject matter. It is, of course, not possible to describe every combination of components or methods herein. One of ordinary skill in the art may recognize that many further combinations and permutations of the disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

What is claimed is:

1. A system comprising:
a processor; and
a memory that stores instructions that, when executed by the processor, facilitates performance of operations, the operations comprising:
tracking an aerial user equipment based on subscription data and location data;
determining that first serving cell equipment is servicing the aerial user equipment and that the first serving cell equipment has enabled a beamforming functionality;
determining that a first beam of a group of beams being emitted from the first serving cell equipment is being used to provide a service to the aerial user equipment, wherein the group of beams comprises system synchronization beam data representative of synchronization data, signal power data, physical cell identification data, and beam identification data associated with servicing the aerial user equipment;
determining a second beam of the group of beams that the first serving cell equipment will use to provide the service to the aerial user equipment;
determining, based at least on the location data and a directionality associated with the second beam, that a handover event from the first serving cell equipment to a second serving cell equipment will occur, wherein the second serving cell equipment is proximate to a defined geographical area; and
in response to determining that the second serving cell equipment is proximate to the defined geographical area, causing the first serving cell equipment to adjust an emitted power level associated with the second beam, wherein in response to the aerial user equipment being unable to receive the synchronization beam data, the aerial user equipment is configured to alter a flight trajectory to attached to a third beam of the group of beams, and wherein the emitted power level is a first emitted power level and wherein the third beam is associated with a second emitted power level that is greater than the first emitted power level.

2. The system of claim 1, wherein the second emitted power level further exceeds a threshold power level associated with the group of beams.

3. The system of claim 1, wherein the subscription data represents an international mobile subscriber identifier value representative of the aerial user equipment.

4. The system of claim 1, wherein the location data represents geolocation and time information received via global navigation satellite system equipment.

5. The system of claim 1, wherein the directionality is a second directionality, wherein a first directionality is associated with the first beam, and wherein the first directionality differs from the second directionality.

6. A method, comprising:
tracking, by a device comprising a processor, an aerial user equipment based on subscription data and location data;
in response to receiving a command, via core network equipment, initiating, by the device, a beamforming functionality;
determining, by the device, that a first beam of a group of beams is being used to provide a service to the aerial user equipment, wherein the group of beams comprises system synchronization beam data representative of synchronization data, signal power data, physical cell identification data, and beam identification data associated with servicing the aerial user equipment;
determining, by the device, a second beam of the group of beams that will be used to provide the service to the aerial user equipment;
based at least on the location data and a direction associated with the second beam, determining, by the device, that a handover event from the device to a first serving cell equipment will occur, wherein the first serving cell equipment is proximate to a defined geographical area; and
in response to determining that the first serving cell equipment is proximate to the defined geographical area, reducing, by the device, an emitted power level associated with the second beam, wherein in response to the aerial user equipment being unable to receive the synchronization beam data, causing, by the device, the aerial user equipment to change a flight trajectory to seek a third beam of the group of beams, and wherein the emitted power level is a first emitted power level and wherein the third beam is associated with a second emitted power level that is greater than the first emitted power level.

7. The method of claim 6, wherein the second emitted power level further exceeds a threshold power level associated with the group of beams.

8. The method of claim 6, wherein the direction is a second direction, wherein a first direction is associated with the first beam, and wherein the first direction is different from the second direction.

9. The method of claim 6, wherein the subscription data represents an international mobile subscriber identifier value representative of the aerial user equipment.

10. The method of claim 6, wherein the location data represents geolocation and time information received via global navigation satellite system equipment.

11. A non-transitory machine-readable medium, comprising executable instructions that, when executed by a processor, facilitate performance of operations, the operations comprising:
determining that first serving cell equipment is servicing an aerial user equipment and that the first serving cell equipment has enabled a beamforming functionality;
determining that a first beam of a group of beams being emitted by the first serving cell equipment is being used to provide a service to the aerial user equipment, wherein the group of beams comprises system synchronization beam data representing synchronization data, signal power data, physical cell identification data, and beam identification data associated with servicing the aerial user equipment;
determining a second beam of the group of beams that the first serving cell equipment will use to provide the service to the aerial user equipment;
determining, based on location data associated with the aerial user equipment and a direction associated with the second beam, that a handover event from the first serving cell equipment to a second serving cell equipment will occur, wherein the second serving cell equipment is proximate to a defined geographical area; and
in response to determining that the second serving cell equipment is proximate to the defined geographical area, causing the first serving cell equipment to adjust an emitted power level associated with the second beam, wherein in response to the aerial user equipment being unable to receive the synchronization beam data, the aerial user equipment is configured to alter a flight trajectory to attached to a third beam of the group of beams, and wherein the emitted power level is a first emitted power level and wherein the third beam is associated with a second emitted power level that is greater than the first emitted power level.

12. The non-transitory machine-readable medium of claim 11, wherein the operations further comprise tracking the aerial user equipment based on the location data and subscription data associated with the aerial user equipment.

13. The non-transitory machine-readable medium of claim 12, wherein the subscription data represents an international mobile subscriber identifier value representative of the aerial user equipment.

14. The non-transitory machine-readable medium of claim 11, wherein the second emitted power level further exceeds a threshold power level associated with the group of beams.

15. The non-transitory machine-readable medium of claim 11, wherein the location data represents geolocation and time information received via global navigation satellite system equipment.

16. The non-transitory machine-readable medium of claim 11, wherein the direction is a second direction, wherein a first direction is associated with the first beam, and wherein the first direction differs from the second direction.

* * * * *